(12) United States Patent
Colley

(10) Patent No.: US 10,718,344 B2
(45) Date of Patent: Jul. 21, 2020

(54) HUMAN GRASPABLE PROPULSION DEVICE

(71) Applicant: John Christian Colley, Harrison City, PA (US)

(72) Inventor: John Christian Colley, Harrison City, PA (US)

(*) Notice: Subject to any disclaimer, the term of this patent is extended or adjusted under 35 U.S.C. 154(b) by 257 days.

(21) Appl. No.: 15/984,321

(22) Filed: May 19, 2018

(65) Prior Publication Data

US 2018/0266424 A1 Sep. 20, 2018

Related U.S. Application Data

(63) Continuation-in-part of application No. 15/436,882, filed on Feb. 20, 2017, now Pat. No. 10,179,273.

(51) Int. Cl.
| | |
|---|---|
| *B60K 8/00* | (2006.01) |
| *A63C 17/00* | (2006.01) |
| *F04D 25/06* | (2006.01) |
| *F02B 61/04* | (2006.01) |
| *F04D 27/00* | (2006.01) |
| *F04D 25/08* | (2006.01) |
| *B64C 39/02* | (2006.01) |

(Continued)

(52) U.S. Cl.
CPC .......... *F04D 25/0673* (2013.01); *A63C 11/10* (2013.01); *A63C 17/0013* (2013.01); *B60K 8/00* (2013.01); *B64C 39/026* (2013.01); *F02B 61/04* (2013.01); *F04D 25/086* (2013.01); *F04D 27/004* (2013.01); *F04D 29/522* (2013.01)

(58) Field of Classification Search
CPC .. F04D 25/0673; F04D 25/086; F04D 27/004; F04D 29/522; A63C 11/10; A63C 17/0013; B60K 8/00; B64C 39/026; F02B 61/04

See application file for complete search history.

(56) References Cited

U.S. PATENT DOCUMENTS

| | | |
|---|---|---|
| 2,456,440 A | 12/1948 | Morrill |
| 5,562,176 A | 10/1996 | Lucernoni |
| 9,114,695 B2 | 8/2015 | Burgess, Jr. |

(Continued)

*Primary Examiner* — Bryan A Evans

(57) ABSTRACT

The invention is directed to a graspable human propulsion device comprising a primary pole, a lateral pole affixed to the fore end of the primary pole, and a ducted fan assembly affixed to one end the primary pole and configured to accelerate airflow along the longitudinal axis of the primary pole. A user wields the graspable human propulsion device by grasping the primary pole with a first hand and the lateral pole with a second hand. The graspable human propulsion device acts to propel the user along the direction in which the longitudinal axis of the primary pole is pointed. This device is intended to be utilized by a user mounted on a personal transportation apparatus, such as a skateboard. In one embodiment the user controls the amount of thrust by use of a throttle lever mechanism. In another embodiment the user controls the direction and amount of thrust by use of a knobbed slide potentiometer. In a third embodiment the user controls the direction and amount of thrust by use of a twist throttle mechanism. The graspable human propulsion device of the present invention provides a conveniently balanced, easily wielded, and enjoyable propulsive experience for the user.

20 Claims, 15 Drawing Sheets

(51) Int. Cl.
  *A63C 11/10* (2006.01)
  *F04D 29/52* (2006.01)

(56) References Cited

U.S. PATENT DOCUMENTS

| | | | |
|---|---|---|---|
| 9,387,388 B2 | 7/2016 | King | |
| 2004/0231903 A1* | 11/2004 | Shayan | A63C 5/08 180/180 |
| 2006/0131084 A1* | 6/2006 | Rupp | A63C 17/0013 180/65.1 |
| 2007/0010143 A1* | 1/2007 | Burgess, Jr. | A63C 17/267 440/1 |
| 2008/0257628 A1* | 10/2008 | Pitt | A63C 17/0013 180/181 |
| 2008/0290616 A1* | 11/2008 | Burgess, Jr. | A63C 17/267 280/1 |
| 2011/0017539 A1* | 1/2011 | Pitt | A63C 17/0013 180/180 |
| 2012/0020790 A1* | 1/2012 | Burgess, Jr. | A63C 17/0013 416/63 |
| 2014/0109283 A1* | 4/2014 | Burgess, Jr. | B60K 8/00 2/69 |
| 2015/0064004 A1* | 3/2015 | Contoret | A63C 11/10 416/1 |
| 2017/0205820 A1* | 7/2017 | Liu | A63C 17/267 |
| 2017/0217511 A1* | 8/2017 | Orlovskiy | B62M 6/45 |
| 2018/0257486 A1* | 9/2018 | Noble Nava | A63C 17/0013 |

\* cited by examiner

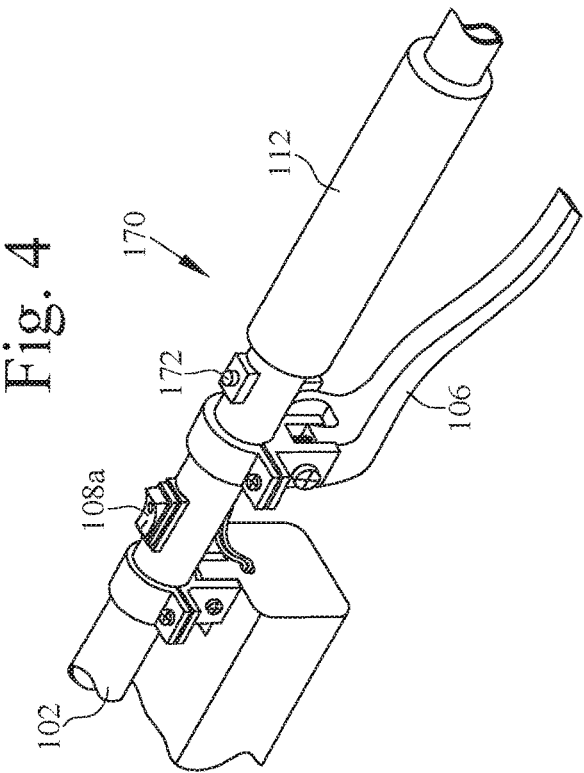
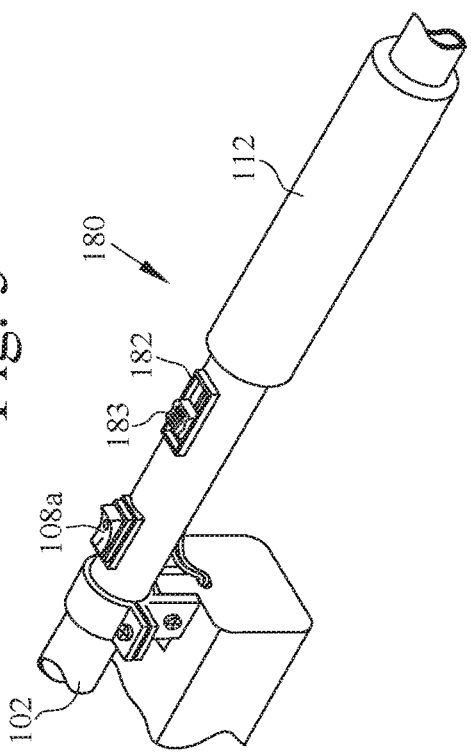
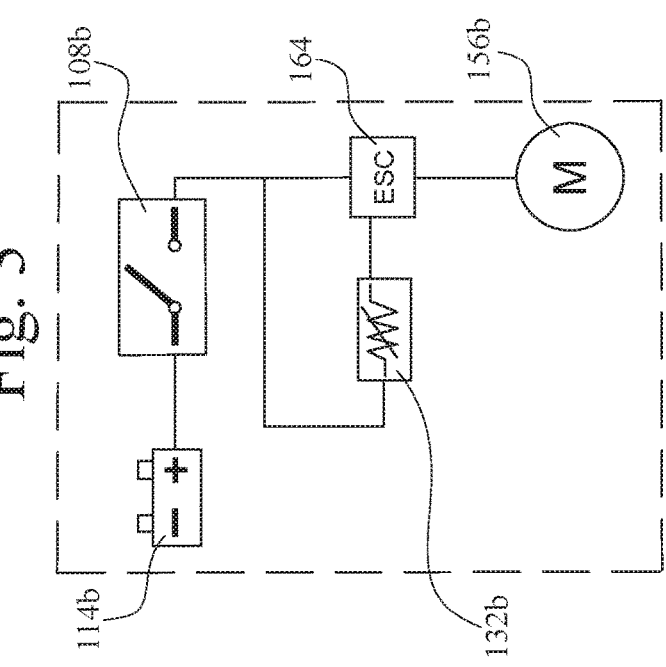

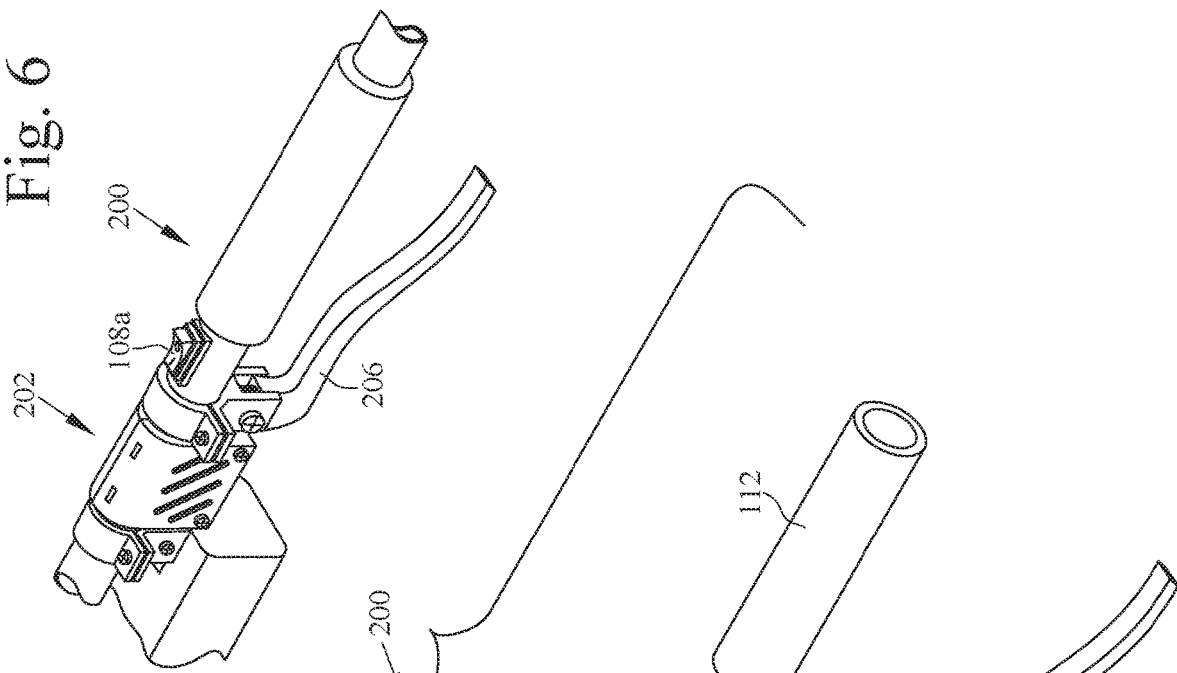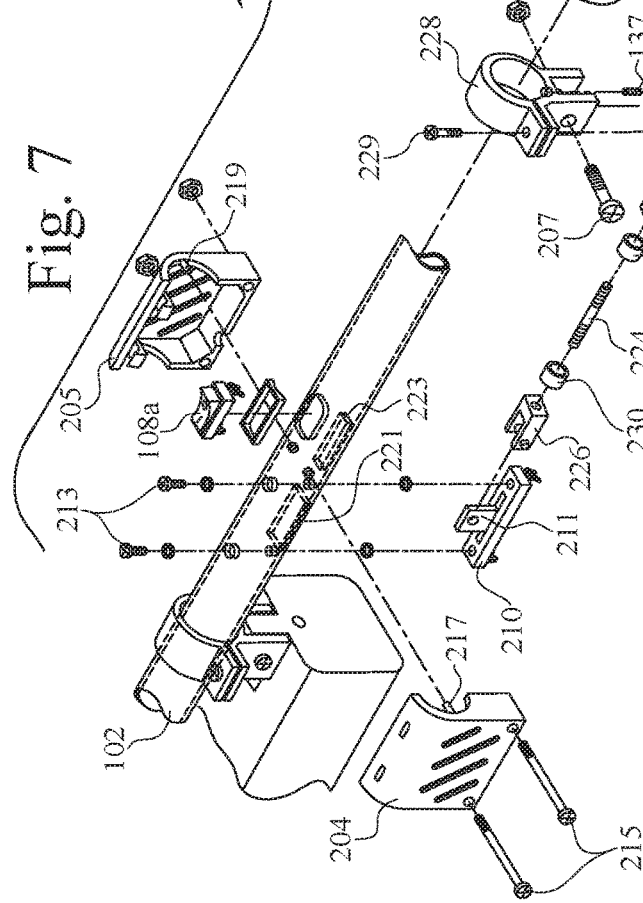

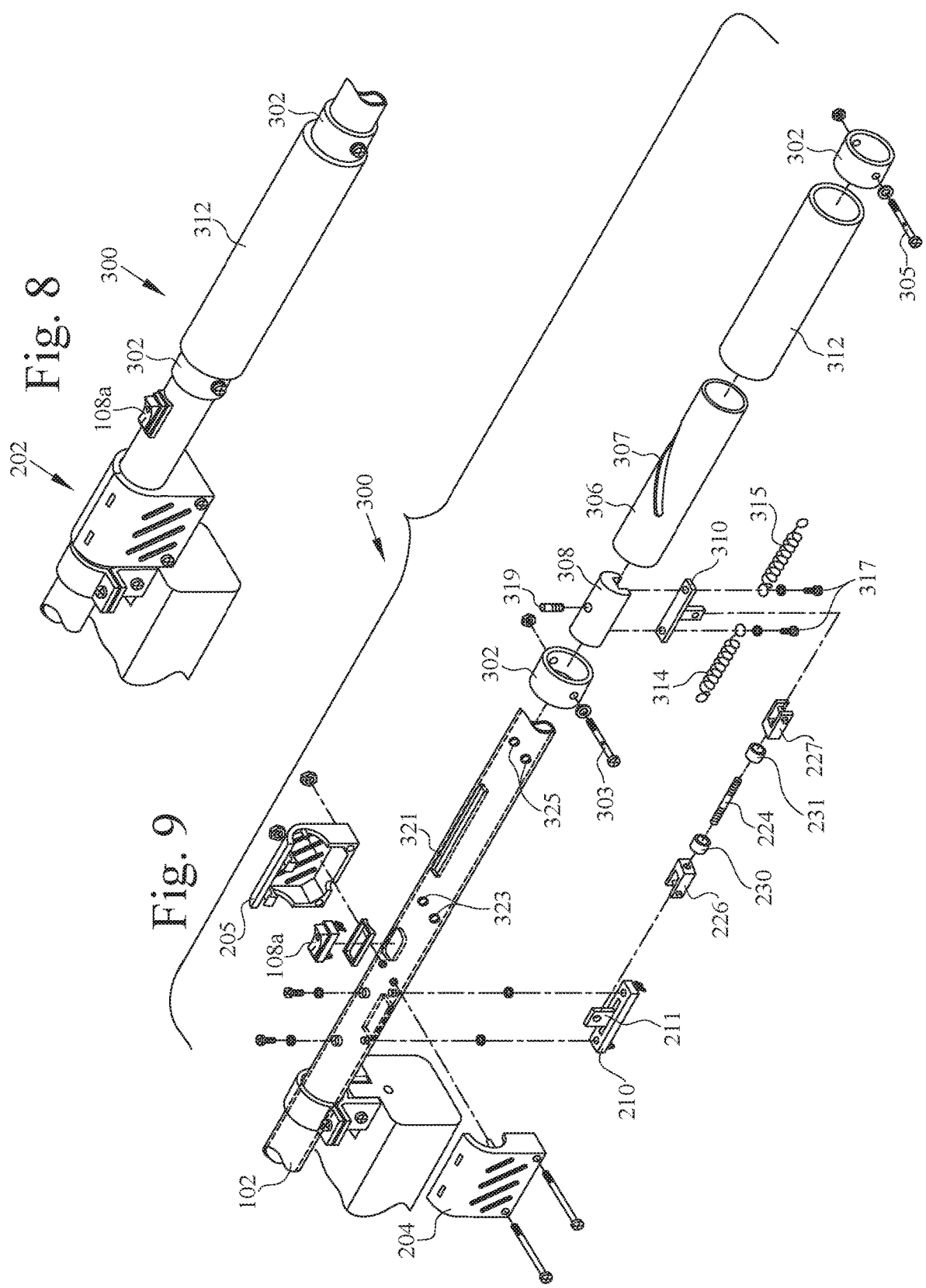

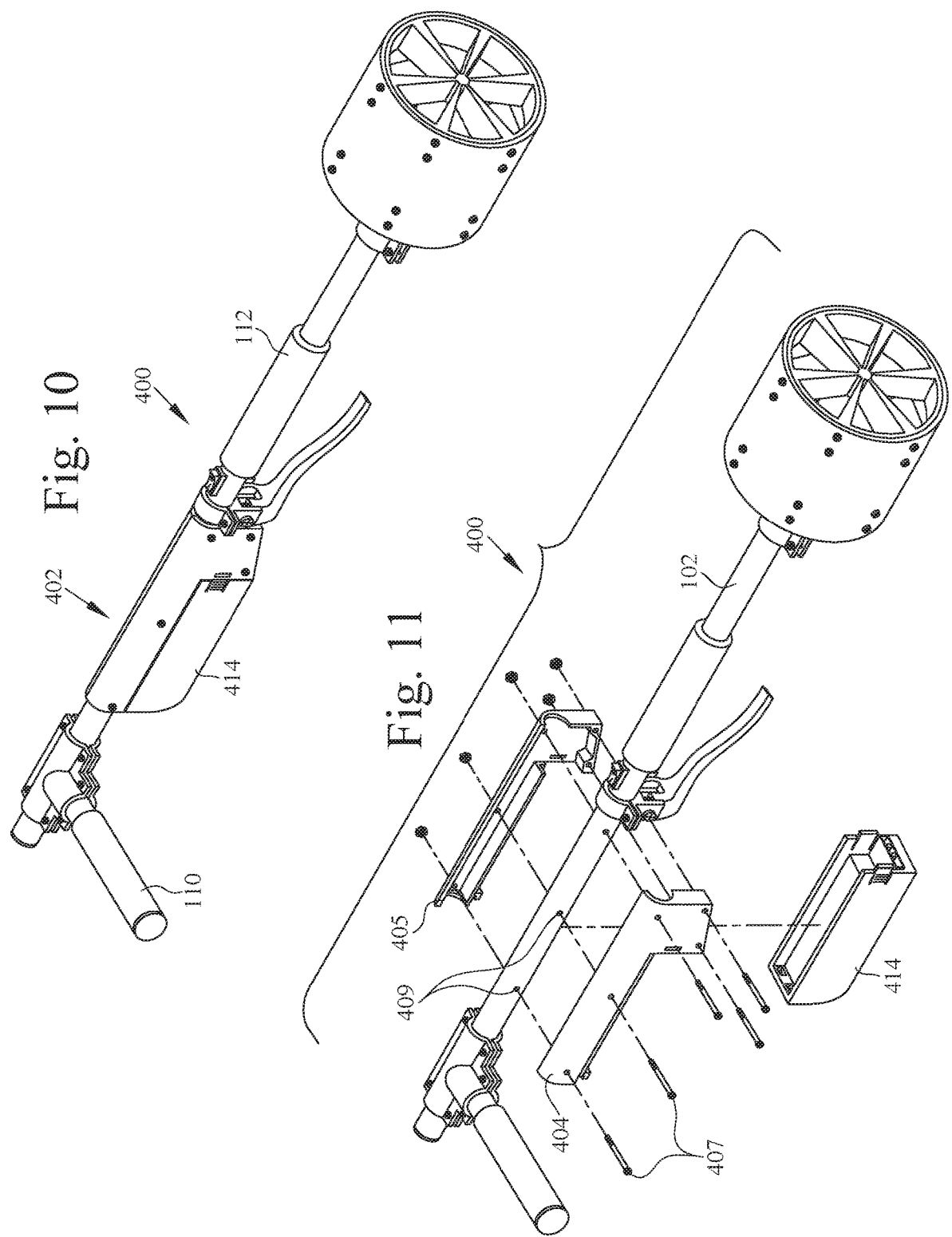

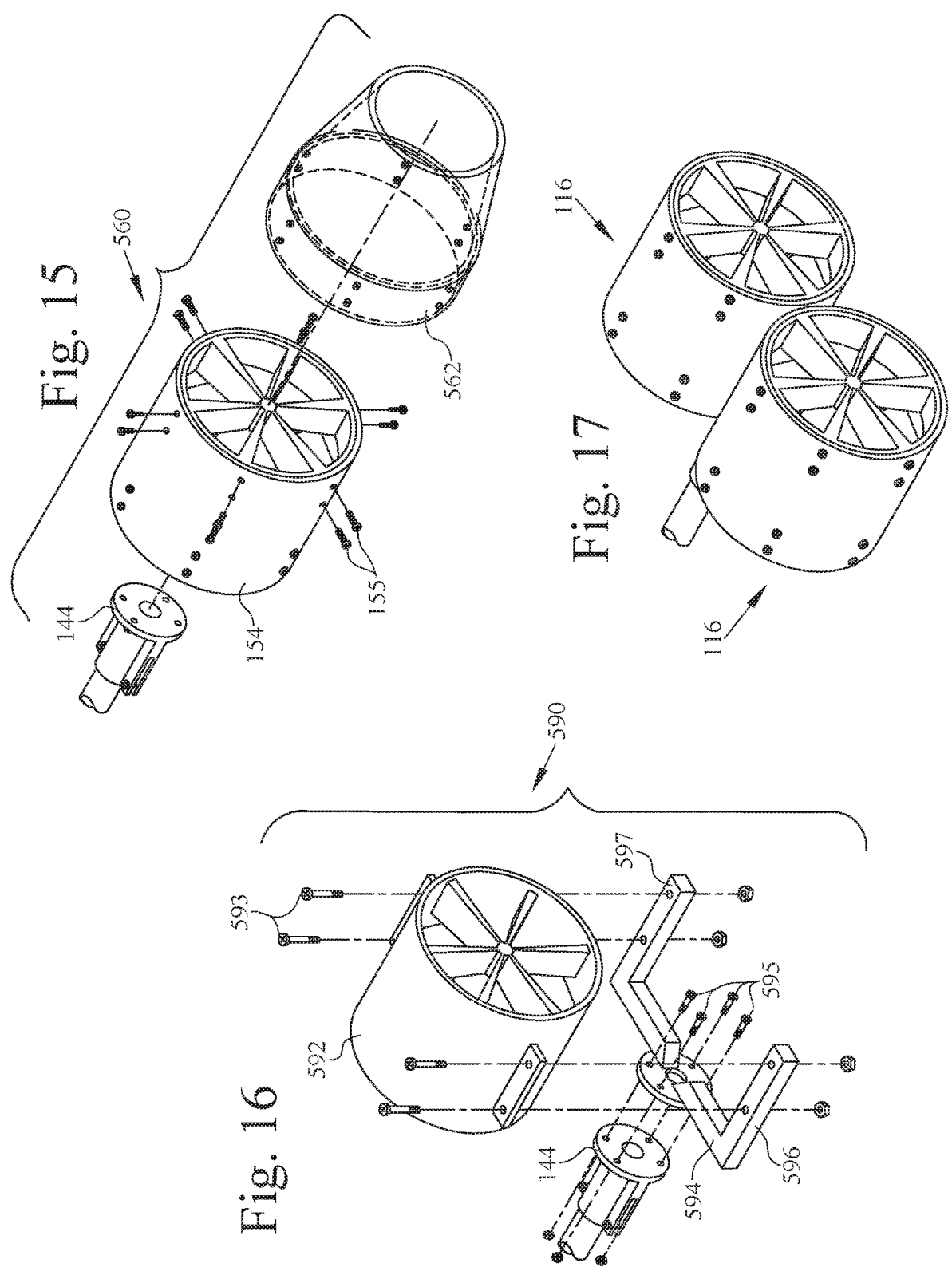

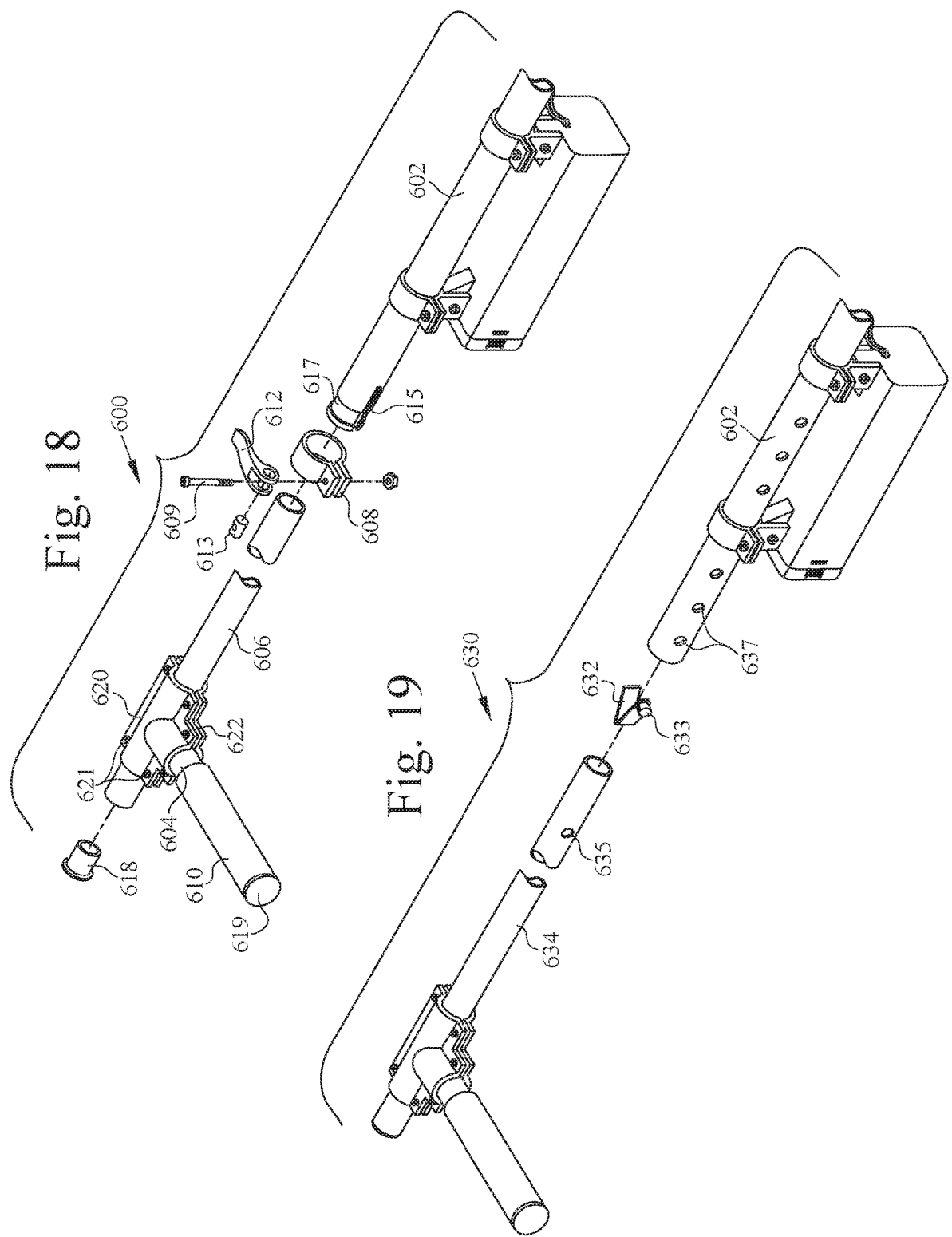

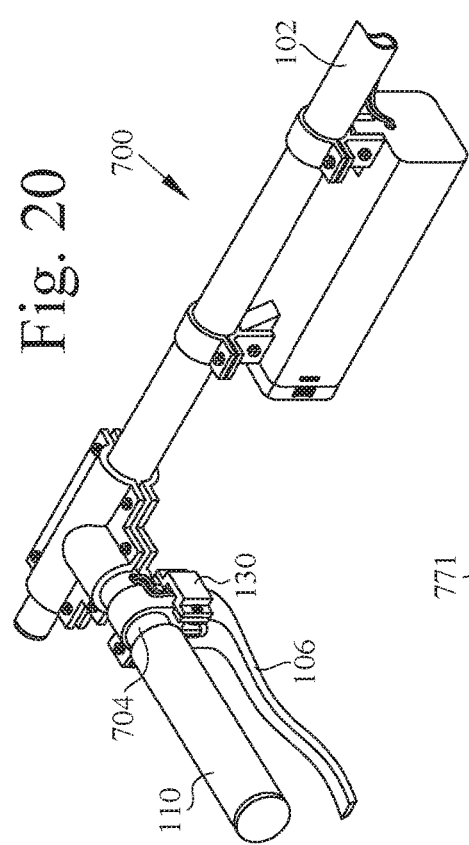
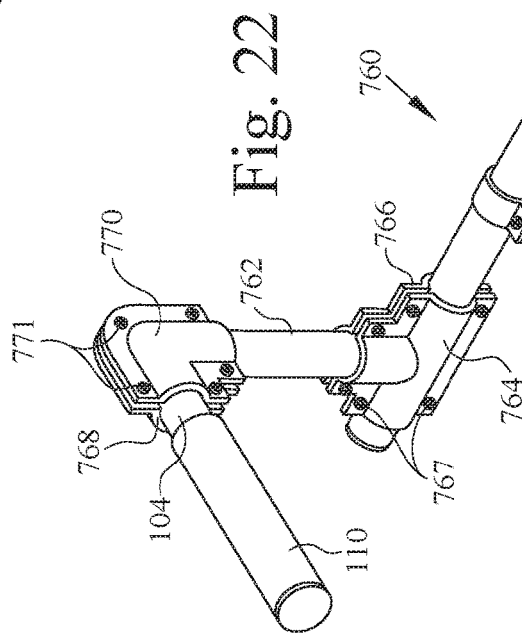
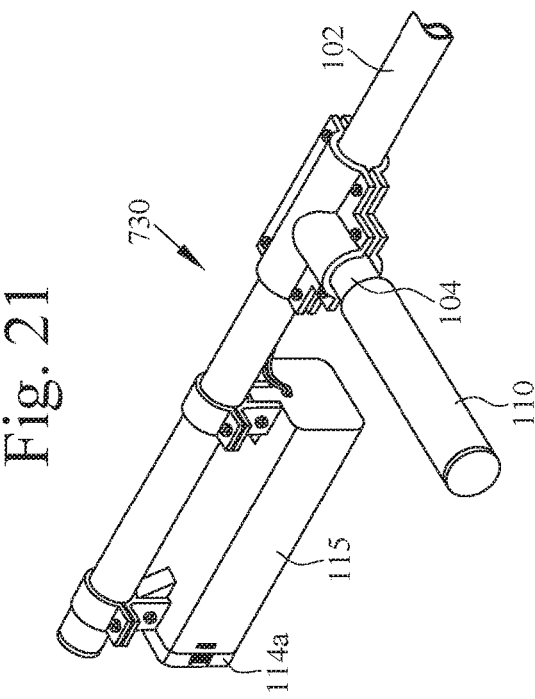

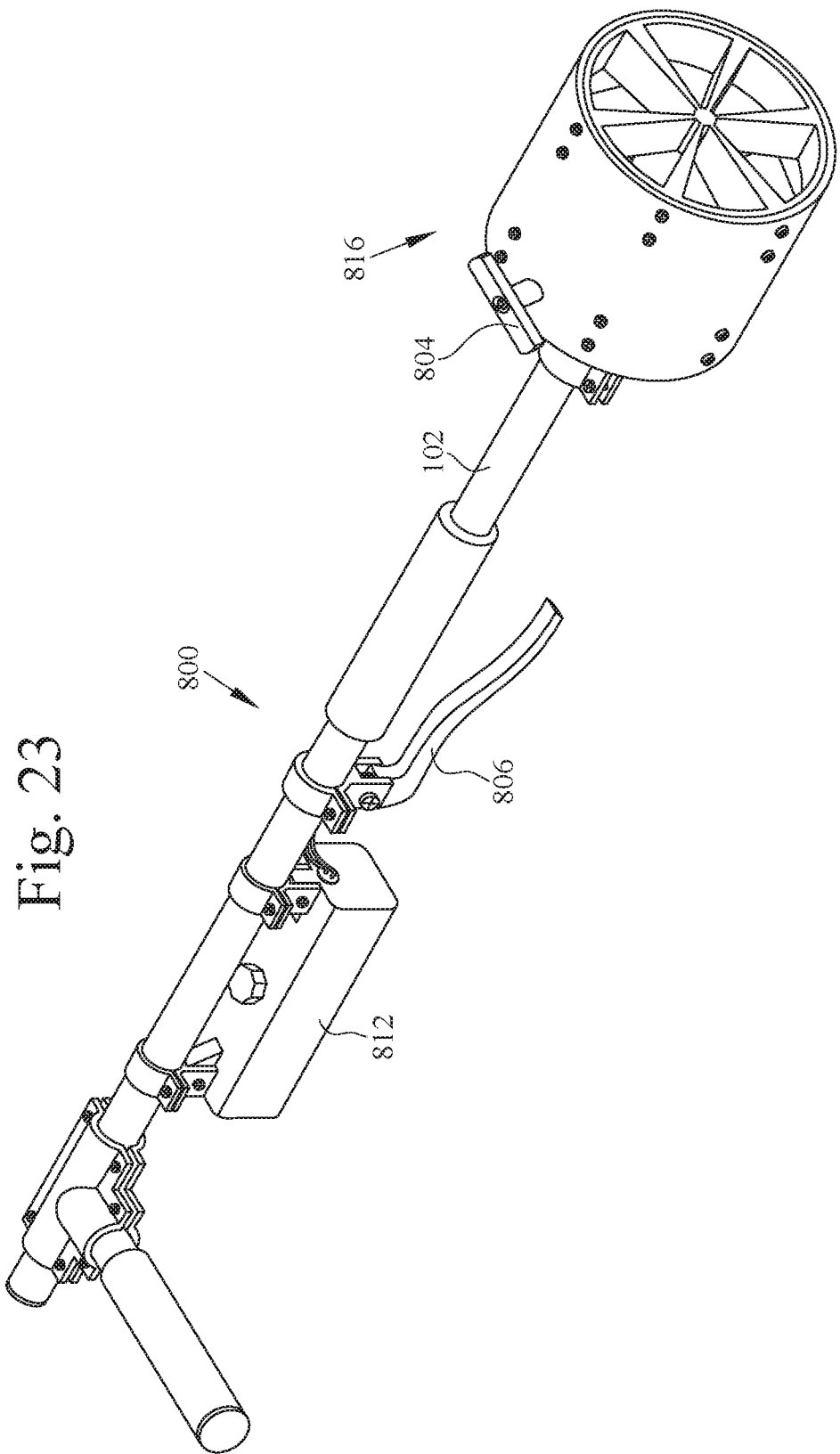

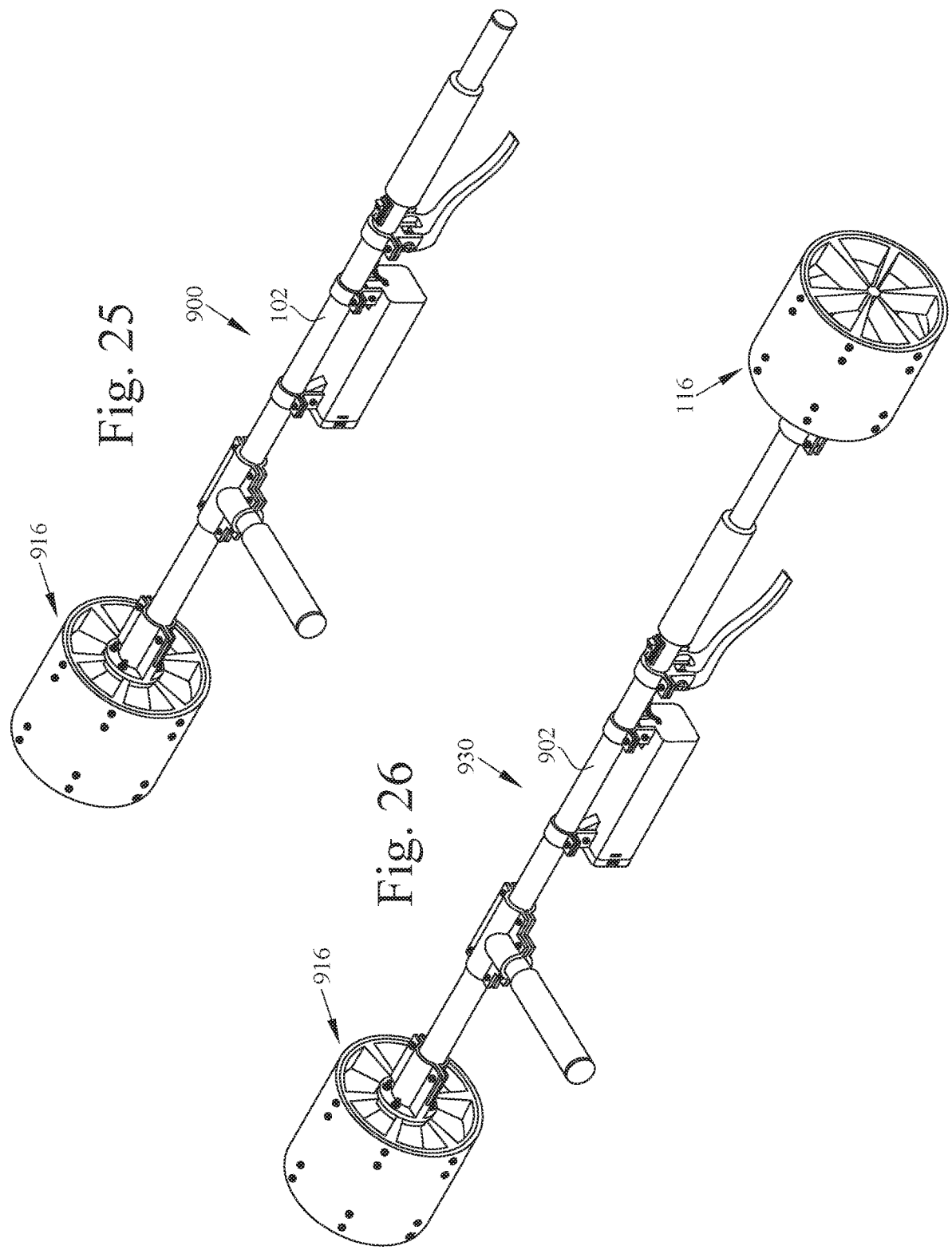

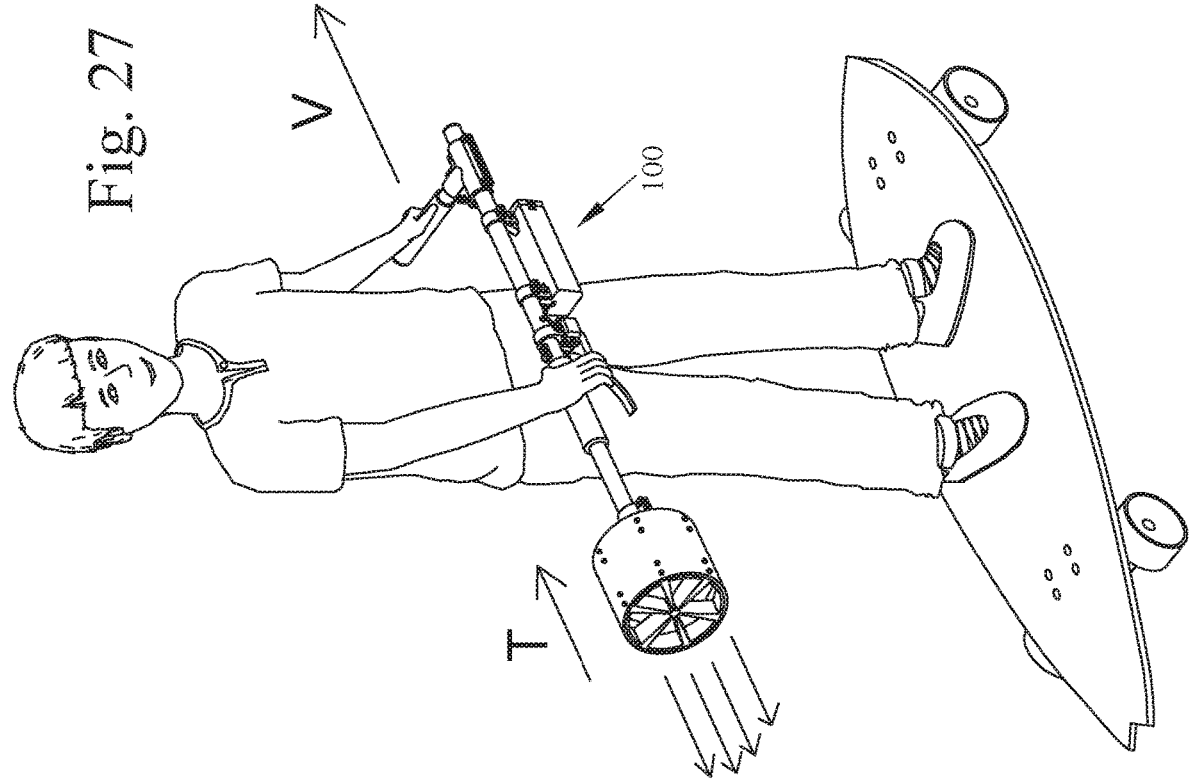

HUMAN GRASPABLE PROPULSION DEVICE

CROSS-REFERENCE TO RELATED APPLICATIONS

This is a continuation-in-part application in reference to application U.S. Ser. No. 15/436,882, filed 2017 Feb. 20.

FEDERALLY SPONSORED RESEARCH

Not Applicable

SEQUENCE LISTING OR PROGRAM

Not Applicable

BACKGROUND OF THE INVENTION—FIELD OF INVENTION

This invention relates to propulsion accessories for imparting thrust pertaining to users on personal transportation apparatuses including but not limited to skateboards, roller blades, skis, and snowboards.

BACKGROUND OF THE INVENION—PRIOR ART

Historically, propulsion of skateboards, roller blades, skis, snowboards, and similar personal transportation apparatuses relied solely on human power input or the force of gravity to achieve and maintain a velocity. In recent years, stored energy propulsion devices have been developed to propel humans mounted on these personal transportation apparatuses without the need of human power input or gravitational potential energy. Presently, a common solution for propelling users on skateboards is to use either a direct or indirect electric drive motor system connected to the skateboard wheels. U.S. Pat. No. 9,387,388 B2 (King) is one example of such an installed drive system. However, it exemplifies the lack of versatility of direct and indirect drive motor systems since they must be intricately installed to a skateboard, and are not easily transferable to different model skateboards or other personal transportation apparatuses should the user wish to do so. Therefore, significant cross-compatibility issues exist with these wheel drive motor systems.

U.S. Pat. No. 5,562,176 (Lucernoni et al.) solves this cross-compatibility issue, however, this invention is not simple to use since it requires the user to maintain proper ground contact with the device at all times. This also creates serious safety issues should this device be used in conjunction with a skateboard. During operation, this device would have to be used in close proximity to the skateboard deck which can result in dangerous entanglements and injury. In addition, this invention is unable to operate on snowy or icy surfaces, rendering it incompatible with skis and snowboards.

U.S. Pat. No. 9,114,695 B2 (Burgess) teaches of a backworn device that utilizes a motorized propeller to propel the user while mounted on a personal transportation apparatus. However, the applications of this invention are limited since the direction of thrust is restricted to the direction in which the user's chest is facing, which is not practical for propelling a user on skateboard or snowboard since the user's chest generally remains perpendicular to the direction of forward travel. In addition, this device must be strapped to the user's back which makes it difficult for the user to remove in case of an emergency.

US 2015/0064004 A1 (Contoret) teaches a device that uses two air thrusters positioned at the ends of a pole, with the direction of thrust being perpendicular to the pole. This, however, can be uncomfortable to operate since the user must hold this device out in front of his or her body during operation which can cause muscle fatigue in the user's arms. Also, this device is difficult to use in conjunction with users on skateboards or snowboards since the natural riding positions of such personal transportation apparatuses involves the user's chest pointing perpendicular to the direction of forward travel. As a result, in order for the user to operate this device while on a skateboard or snowboard, the user has to continuously strain one's posture to align the thrust with the direction of forward travel. In addition, this is not a stable device to hold since the device can easily tip forward or backward while in the user's hands, potentially producing an undesired downward or upward thrust component.

U.S. Pat. No. 2,456,440 (Morrill) teaches a device that utilizes an air thruster to deliver a forward force to the user's back while being vertically supported by the user's forearm. This configuration, however, causes immediate fatigue since the entire weight of the device must be supported by the user's single horizontally disposed forearm. In addition, in order to provide a forward thrust to a user on a skateboard, the user must constantly point his or her forearm in the direction of forward travel, which can be a cumbersome and unnatural posture for a user on a skateboard to maintain. Lastly, this device utilizes a hook secured to the user's forearm. This added entanglement poses a safety hazard if the user needs to quickly ditch the device in case of an emergency.

All the human propulsion devices heretofore known suffer from a number of disadvantages:

(a.) User-held human propulsion devices of the present require skateboard riders to maintain uncomfortable postures in order to wield, thereby reducing the practicality and enjoyment of their usage.

(b.) Serious bodily injury can occur if a human propulsion device is required to be attached onto the body of the user, especially if it is required to be strapped onto the back, and the user accidently tumbles into objects or onto the ground.

(c.) Motorized wheel drive assemblies lack versatility and are not cross-compatible with different skateboard models and other personal transportation apparatuses.

(d.) Human propulsion devices consisting of motorized wheel drive assemblies suffer losses of performance on snowy or icy surfaces.

(e.) Motorized wheel drive assemblies as means for human propulsion currently consist of complex mechanisms and endure significant wear-and-tear.

BACKGROUND OF THE INVENTION—OBJECTS AND ADVANTAGES

Accordingly, several objects and advantages of the present invention are:

(a.) to provide a human propulsion device which demonstrates versatility such that the device is compatible with an assortment of personal transportation apparatuses including skateboards, roller blades, skis, and snowboards;

(b.) to provide a human propulsion device which is comfortable to operate, particularly for users mounted on skateboards;
(c.) to provide a human propulsion device which is simple to construct and has few moving parts;
(d.) to provide a human propulsion device which is held by both hands of the user and is easy to ditch in the event of an emergency;
(e.) to provide a human propulsion device which operates regardless of the surface that the personal transportation apparatus is on;

Further objects and advantages will become apparent from a consideration of the ensuing description and drawings.

SUMMARY

In accordance with the present invention, a graspable human propulsion device comprises a primary pole which is to be grasped by one hand of a user, a lateral pole perpendicularly affixed the fore end of the primary pole which is to be grasped by the second hand of the user, a ducted fan assembly mounted on one end of the primary pole for accelerating air along the longitudinal axis of the primary pole, an energy source for powering the ducted fan assembly, and a throttle control means, whereby the graspable human propulsion device provides a user regulated propulsive thrust along the axis of the primary pole which is to be used in conjunction with a personal transportation apparatus such as a skateboard, roller blades, skis, or a snowboard.

DRAWINGS—FIGURES

FIG. 3 is a block diagram of the electrical components of the embodiment shown in FIG. 1;

FIG. 4 is a top isometric view of an alternate user control embodiment;

FIG. 5 is a top isometric view of an alternate user control embodiment;

FIG. 6 is a top isometric view of an alternate user control embodiment;

FIG. 7 is a top isometric exploded view of the embodiment shown in FIG. 6;

FIG. 8 is a top isometric view of an alternate user control embodiment;

FIG. 9 is a top isometric exploded view of the embodiment shown in FIG. 8;

FIG. 10 is a top isometric view of an alternate embodiment featuring an altered battery configuration;

FIG. 11 is a top isometric exploded view of the embodiment shown in FIG. 10;

FIG. 15 is a top isometric exploded view of an alternate ducted fan assembly embodiment;

FIG. 16 is a top isometric exploded view of an alternate embodiment featuring an off-the-shelf ducted fan assembly;

FIG. 17 is a top isometric view of an alternate embodiment featuring a second ducted fan assembly;

FIG. 18 is a top isometric exploded view of an alternate embodiment featuring an extensible pole;

FIG. 19 is a top isometric exploded view of an alternate embodiment featuring an extensible pole;

FIG. 20 is a top isometric view of an alternate embodiment featuring an altered user control location;

FIG. 21 is a top isometric view of an alternate embodiment featuring an altered battery location;

FIG. 22 is a top isometric view of an alternate embodiment featuring an altered fore grip configuration;

FIG. 23 is a top isometric view of an alternate embodiment featuring an internal combustion piston engine;

FIG. 25 is a top isometric view of an alternate embodiment featuring an altered fan assembly location;

FIG. 26 is a top isometric view of an alternate embodiment featuring a fore mounted ducted fan assembly mounted in conjunction with an aft mounted ducted fan assembly;

FIG. 27 is a top isometric view of a user application of the preferred embodiment of the graspable human propulsion device in accordance with the present invention;

Figure 1:
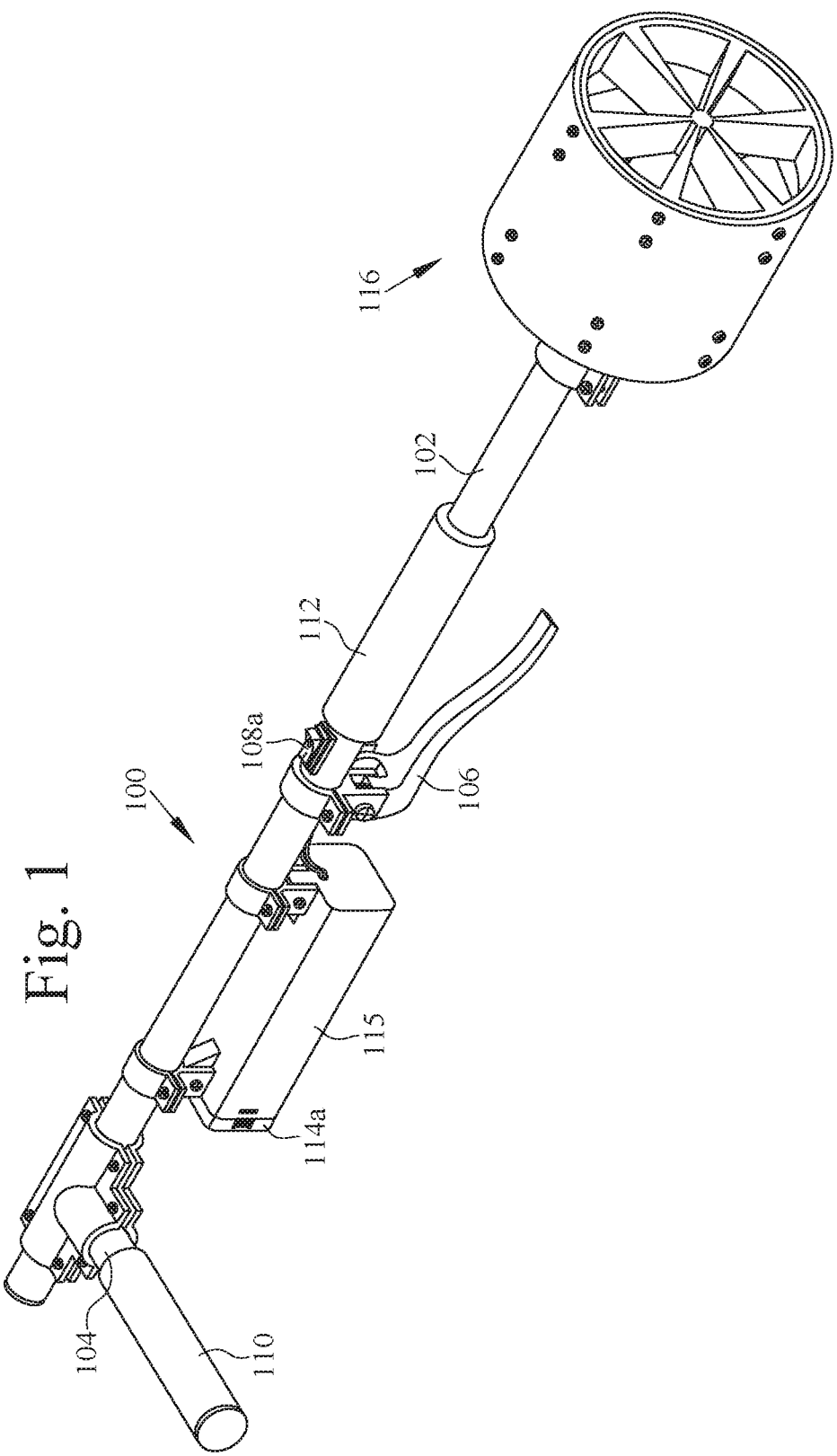
FIG. 1 is a top isometric view of the preferred embodiment of the graspable human propulsion device in accordance with the present invention.

| REFERENCE NUMERALS |
| --- |
| 100- Preferred Embodiment |
| 102- Primary Pole |
| 104- Lateral Pole |
| 106- Throttle Lever |
| 107- Screw |
| 108a- On/Off Switch |
| 108b- On/Off Switch |
| 109- Receptacle |
| 110- Fore Grip Sleeve |
| 112- Aft Grip Sleeve |
| 114a- Battery |
| 114b- Battery |
| 115- Battery Receptacle |
| 116- Ducted Fan Assembly |
| 118- End Cap |
| 119- End Cap |
| 120- Upper Fitting |
| 121- Screws |
| 122- Lower Fitting |
| 124- Clamps |
| 125- Screws |
| 127- Screws |
| 128- Clamp |
| 129- Screw |
| 130- Housing |
| 131- Screws |
| 132a- Rotary Potentiometer |
| 132b- Rotary Potentiometer |
| 133- Hole |
| 135- Cutout |
| 137- Set Screw |
| 138- Spring |
| 139- Set Screw |
| 141- Hole |
| 143- Cutout |
| 144- Mount |
| 145- Screws |
| 147- Notches |
| 149- Countersink Screws |
| 150- Fore Stator Support |
| 151- Tapped Holes |
| 153- Screws |
| 154- Duct |
| 155- Screws |
| 156a- Electric Motor |
| 156b- Electric Motor |
| 157- Tapped Holes |
| 158- Threaded Shaft |

REFERENCE NUMERALS

- 159- Nut
- 160- Fan
- 162- Aft Stator Support
- 163- Tapped Holes
- 164- Electronic Speed Control
- 170- Alternate Embodiment
- 172- Push Button
- 180- Alternate Embodiment
- 182- Knobbed Slide Potentiometer
- 183- Knob
- 200- Alternate Embodiment
- 202- Housing Assembly
- 204- Left Housing
- 205- Right Housing
- 206- Throttle Lever
- 207- Screw
- 209- Arm
- 210- Slide Potentiometer
- 211- Arm
- 213- Screws
- 215- Screws
- 217- Pin
- 219- Pin
- 221- Slot
- 223- Slot
- 224- Threaded Rod
- 226- Fore Clevis
- 227- Aft Clevis
- 228- Clamp
- 229- Screw
- 230- Fore Elastic Band
- 231- Aft Elastic Band
- 233- Hole
- 300- Alternate Embodiment
- 302- Rings
- 303- Screw
- 305- Screw
- 306- Sleeve
- 307- Canted Slot
- 308- Element
- 310- Arm
- 312- Aft Grip Sleeve
- 314- Fore Tension Spring
- 315- Aft Tension Spring
- 317- Screws
- 319- Set Screw
- 321- Slot
- 323- Holes
- 325- Holes
- 400- Alternate Embodiment
- 402- Battery Housing Assembly
- 404- Left Battery Housing
- 405- Right Battery Housing
- 407- Screws
- 409- Holes
- 414- Battery
- 500- Alternate Ducted Fan Assembly
- 502- Duct
- 504- Fan
- 506- Electric Motor
- 508- Aft Stator Support
- 530- Alternate Ducted Fan Assembly
- 532- Fore Cover
- 533- Aft Cover
- 534- Protective Fore Mesh
- 535- Protective Aft Mesh
- 536- Flange
- 537- Flange
- 560- Alternate Ducted Fan Assembly
- 562- Converging Nozzle
- 590- Alternate Embodiment
- 592- Off-The-Shelf Ducted Fan Assembly
- 593- Screws
- 594- Mount
- 595- Screws
- 596- Left Arm
- 597- Right Arm

REFERENCE NUMERALS

- 600- Alternate Embodiment
- 602- Major Hollow Pole
- 604- Lateral Pole
- 606- Minor Pole
- 608- Clamp
- 609- Screw
- 610- Fore Grip Sleeve
- 612- Cam Lever
- 613- Pin
- 615- Notch
- 617- Groove
- 618- End Cap
- 619- End Cap
- 620- Upper Fitting
- 621- Screws
- 622- Lower Fitting
- 630- Alternate Embodiment
- 632- Flat Spring Button Clip
- 633- Button
- 634- Minor Hollow Pole
- 635- Hole
- 637- Holes
- 700- Alternate Embodiment
- 704- Lateral Pole
- 730- Alternate Embodiment
- 760- Alternate Embodiment
- 762- Vertical Pole
- 764- Left Fitting
- 766- Right Fitting
- 767- Screws
- 768- Fore Fitting
- 770- Aft Fitting
- 771- Screws
- 800- Alternate Embodiment
- 802- Internal Combustion Piston Engine
- 803- Screws
- 804- Pull String Handle
- 805- Carburetor Control Arm
- 806- Throttle Lever
- 807- Cutout
- 808- Threaded Shaft
- 809- Arm
- 810- Engine Mount
- 811- Screws
- 812- Fuel Tank
- 813- Cap
- 815- Fuel Line Seal
- 816- Ducted Fan Assembly
- 817- Pin
- 818- Lever
- 819- Spring
- 824- Pushrod
- 826- Fore Clevis
- 827- Aft Clevis
- 830- Fore Elastic Band
- 831- Aft Elastic Band
- 833- Hole
- 835- Slot
- 837- Hole
- 900- Alternate Embodiment
- 902- Primary Pole
- 916- Ducted Fan Assembly
- 930- Alternate Embodiment

DETAILED DESCRIPTION—PREFERRED EMBODIMENT—FIGS. 1, 2, 3

FIG. 1 shows a preferred embodiment 100 of the graspable human propulsion device in accordance with the present invention. Preferred embodiment 100 comprises a primary pole 102, a lateral pole 104, a ducted fan assembly 116, a battery 114a, a battery receptacle 115, a throttle lever 106, an on/off switch 108a, a fore grip sleeve 110, and an aft grip sleeve 112.

Figure 2:
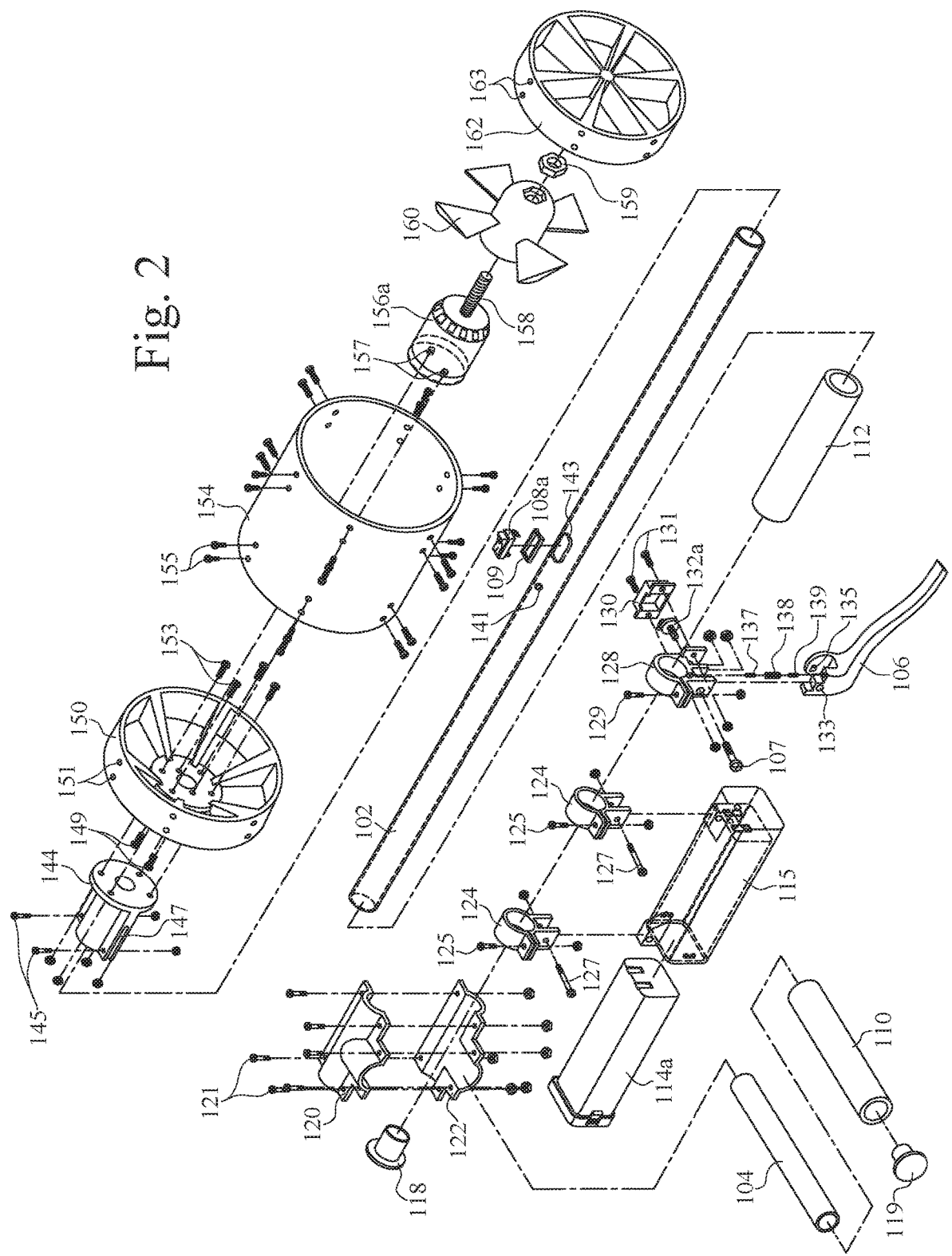
FIG. 2 is a top isometric exploded view of the embodiment shown in FIG. 1.

Primary pole 102 preferably has a hollow circular cross-section with a length of approximately three feet. However, in other embodiments the length of primary pole 102 can range between 1 foot and 6 feet. Primary pole 102 is preferably manufactured from a composite material, such as carbon fiber, but can also be manufactured from metal, wood, or plastic. Lateral pole 104 preferably has a length of approximately 6 inches and has the same material properties as primary pole 102. However, in other embodiments the length of lateral pole 104 can range between 3 inches and 20 inches. As shown in FIG. 2, lateral pole 104 is clamped relatively perpendicular to the fore end of primary pole 102 using an upper fitting 120 and a lower fitting 122 with screws 121. The use of upper fitting 120 and lower fitting 122 allow the user to alter the position of lateral pole 104 if desired. The inner surfaces of upper fitting 120 and lower fitting 122 are adapted to match the outer contour of primary pole 102 and lateral pole 104. Upper fitting 120 and lower fitting 122 are preferably manufactured as a machined metal but can also be manufactured as a molded plastic. In other embodiments the lateral pole can be welded directly to the primary pole if they are both made of metal, thereby eliminating the need for fittings. In addition, the lateral pole can be molded as the same piece as the primary pole if made of plastic. Alternatively, the lateral pole and the primary pole can be formed as one piece from a bent metal pipe. Similarly, if the lateral pole and the primary pole are manufactured as a composite material, they can be laid up as a single structure. The configuration of lateral pole 104 and primary pole 102 allows the user to easily grasp thereon with one hand on lateral pole 104 and the other hand on primary pole 102. Note that in other embodiments primary pole 102 and lateral pole 104 may each be manufactured to have slightly curved or jogged centerlines, thereby improving user ergonomics.

An end cap 118 is sized to plug the fore end of primary pole 102. End cap 118 is preferably plastic molded and secured to primary pole 102 with a structural adhesive substance. An end cap 119 preferably has the same material properties as end cap 118 and is sized to plug the open end of lateral pole 104. A mount 144 has a hollow interior and is adapted to fit over the aft end of primary pole 102. Mount 144 further includes notches 147 in its wall thereby reducing its overall stiffness such that it can be clamped to the aft end of primary pole 102 by tightening screws 145. Mount 144 is preferably manufactured as a molded plastic but can also be manufactured as a machined metal. The aft end of mount 144 is sized for installation of ducted fan assembly 116 using screws 153.

Ideally, ducted fan assembly 116 comprises a fore stator support 150, a duct 154, an electric motor 156a, a fan 160, and an aft stator support 162. Electric motor 156a is preferably a brushless electric motor with a threaded shaft 158 whereby fan 160 is affixed thereon by sandwiching with a nut 159. Fan 160 can have an arbitrary number of blades, preferably between four and twelve, and adapted so that the blade diameter is slightly less than the inner diameter of duct 154. Fan 160 is preferably manufactured as a molded plastic but can also be manufactured from machined metal. In other embodiments the fan can have a keyed hole and the electric motor can have a keyed unthreaded shaft, whereby the fan's keyed hole can be secured to the electric motor shaft with an interference fit. Note that in other embodiments the electric motor can be used to drive the fan by means of a gearbox. Electric motor 156a also has tapped holes 157 in its non-rotating base such that it can be fastened to fore stator support 150 using countersink screws 149. Fore stator support 150 has an inner disk and an outer ring which are concentrically fixed to each other by an arbitrary number of radial support vanes, preferably six. Fore stator support 150 also has tapped holes 151 positioned around its circumference so that it can accommodate attachment to duct 154. Aft stator support 162 has a similar geometry to fore stator support 150 and has tapped holes 163 along its circumference. Fore stator support 150 and aft stator support 162 are preferably manufactured as a molded plastic but can also be manufactured as a machined metal. Note that in other embodiments the fore stator support 150 and mount 144 can be manufactured to be one piece. Also, in other embodiments the electric motor may be fastened to the aft stator support instead of the fore stator support.

Duct 154 preferably has a length of between 3 inches and 12 inches with an inner diameter roughly equal to the outer diameters of fore stator support 150 and aft stator support 162, whereby fore stator support 150 and aft stator support 162 are secured to the ends of duct 154 using screws 155 such to provide rigidity and user safety. Duct 154 is preferably manufactured as a molded plastic but can also be manufactured as a formed metal or a composite material. In other embodiments the fore stator support and the aft stator support can be adhered directly to the duct with a structural adhesive. Ducted fan assembly 116 is fastened to the aft end of mount 144 using screws 153. Note that in other embodiments the aft end of mount 144 can be angled slightly downwards so that the direction of accelerated air from ducted fan assembly 116 is also directed slightly downwards. This configuration causes the graspable human propulsion device to produce a slight upwards thrust which helps to alleviate the apparent weight thereof felt by the user.

Battery receptacle 115 is preferably manufactured as a molded plastic and contains the necessary electrical terminals to accept and draw power from battery 114a. Battery receptacle 115 is preferably secured to the underside of primary pole 102 by means of two clamps 124, proximate a quarter length from the fore end of primary pole 102. Clamps 124 have an inner contour similar to the outer counter of primary pole 102 such that they can be clamped thereon using screws 125. Battery receptacle 115 is secured to the flanged portion of clamps 124 using screws 127. Clamps 124 are preferably manufactured as a molded plastic but can also be manufactured as a machined or formed metal. In other embodiments clamps 124 can be installed to be canted to the right or left side of primary pole 102 such that battery receptacle 115 is tilted to one side, thereby preventing interference with the user's body.

Throttle lever 106 is sized to be squeezed by one or more of the user's fingers and is preferably manufactured as a cast metal but can also be manufactured as a machined metal or molded plastic. Throttle lever 106 is pivotably affixed to the underside of primary pole 102 by means of a clamp 128, proximate halfway along the length of primary pole 102. Clamp 128 has an inner contour similar to the outer contour of primary pole 102 such that it can be clamped thereon using a screw 129. Throttle lever 106 has a hole 133 such that it can be pivotally secured to the flanged portion of clamp 128 using a screw 107. Throttle lever 106 also has a cutout 135 on the same axis as hole 133 which is sized to accept the insertion of the keyed shaft of a rotary potentiometer 132a so that the angular position of throttle lever 106 controls the resistance value of rotary potentiometer 132a. A spring 138 is inserted between throttle lever 106 and clamp 128 so that throttle lever 106 returns to its default position when not being squeezed by the user. A set screw 139 is inserted into throttle lever 106 and a set screw 137 is inserted into clamp 128 such that spring 138 is concentrically constrained between these two set screws. A housing 130 is preferably manufactured as a molded plastic and is sized to cover rotary potentiometer 132a. Housing 130 is secured to the flange of clamp 128 using screws 131. Note that in other embodiments the flanged portions of clamps 124, 128 can be integrated onto primary pole 102 by means of a molded plastic or welded metal, thereby eliminating the need for clamps 124, 128.

Fore grip sleeve 110 is preferably between three and eight inches in length and is concentrically placed around lateral pole 104. Fore grip sleeve 110 is preferably manufactured out of foam with an inner diameter slightly less than the outer diameter of lateral pole 104, thereby ensure a snug interference fit between the two. This interconnection can also be strengthened with a structural adhesive substance. In other embodiments fore grip sleeve 110 can be manufactured as a rubber material. Aft grip sleeve 112 is secured to primary pole 102 in a similar manner, positioned in close proximity to throttle lever 106. These grips act as comfortable grasping points for the user's hands.

On/off switch 108a is preferably located on top of primary pole 102 and exists so that the user can easily power on and off the human graspable propulsion device. Primary pole 102 has a cutout 143 which has a perimeter slightly larger than the inner perimeter of a receptacle 109. Receptacle 109 has an inner perimeter which is sized so that on/off switch 108a can snap therein. Receptacle 109 is secured to primary pole 102 coincidentally with cutout 143 using a structural adhesive. Primary pole 102 also has a hole 141 sized to allow the insertion of electrical wiring from battery receptacle 115 and rotary potentiometer 132a into the interior of primary pole 102 so it can be distributed to the remaining electrical components in accordance with the graspable human propulsion device.

FIG. 3 depicts a block diagram of the electrical components within preferred embodiment 100 of the graspable human propulsion device. On/off switch 108b is configured to supply electrical power from battery 114b to the remaining electrical components when it is in the closed position. Rotary potentiometer 132b is configured with an electronic speed control 164 such that when on/off switch 108b is in the closed position, the resistance value of rotary potentiometer 132b is used to signal electronic speed control 164 to provide a proportional amount of power to electric motor 156b. Ideally, electronic speed control 164 is located inside of primary pole 102 but in other embodiments it can be located within duct 154 or in a separate housing that is attached to primary pole 102.

Operation—Prefered Embodiment—FIGS. 1, 2, 3, 27

FIG. 1 and FIG. 27 illustrate the manner of using preferred embodiment 100 of the human graspable propulsion device. First, the user mounts onto a personal transportation apparatus, this case being a skateboard. The user then grasps preferred embodiment 100 with one hand on fore grip sleeve 110 and the other hand on aft grip sleeve 112 such that primary pole 102 is facing into the direction of forward travel. The user then powers on preferred embodiment 100 by flipping on/off switch 108a, 108b to the on position. The user can then produce a forward imparting thrust by means of squeezing throttle lever 106. This action changes the resistance value of rotary potentiometer 132a, 132b thereby signaling electronic speed control 164 to provide a proportional amount of power to electric motor 156a, 156b which as a result spins fan 160. Rotation of fan 160 forces air through the aft end of ducted fan assembly 116 thereby creating an equal and opposite thrust which propels the user forward. This action enables the user to accelerate or maintain a constant velocity without requiring a manual propulsion means, such as pushing off the ground with a foot. However, the user can combine preferred embodiment 100 with manual propulsion means to achieve even greater propulsive forces. To cut off power from electric motor 156a, 156b, the user simply releases any pressure from throttle lever 106. Lastly, preferred embodiment 100 is shut off by flipping on/off switch 108a, 108b to the off position.

Description—Alternate Embodiments—FIGS. 4-26

FIG. 4 shows an alternate user control embodiment 170. It is similar to preferred embodiment 100 except that it further includes a push button 172 secured to the upper surface of primary pole 102 and fore of aft grip sleeve 112 so that the user can easily press it with his or her thumb. In other embodiments push button 172 may secured to the underside of primary pole 102 so that the user can easily press it with his or her index finger. Push button 172 is configured with electronic speed control 164 such that each time the user presses it, the direction of torque generated by electric motor 156a, 156b caused by squeezing throttle lever 106 is reversed, thereby producing a thrust in the opposite direction.

FIG. 5 shows an alternate user control embodiment 180. It differs from preferred embodiment 100 by including a knobbed slide potentiometer 182 instead of throttle lever 106. Knobbed slide potentiometer 182 is secured to the upper surface of primary pole 102 and fore of aft grip sleeve 112 so that the user can easily slide knob 183 with his or her thumb. Knobbed slide potentiometer 182 is configured with electronic speed control 164 such that the position of knob 183 on knobbed slide potentiometer 182 controls the magnitude and direction of rotation of electric motor 156a, 156b, thereby allowing the user to have fine control of thrust.

FIG. 6 and FIG. 7 show an alternate user control embodiment 200. Unlike the preferred embodiment 100 wherein rotary potentiometer 132a is directly engaged with throttle lever 106, alternate embodiment 200 comprises a slide potentiometer 210 which is indirectly engaged with a throttle lever 206 by means of a threaded rod 224. Primary pole 102 has a slot 221 which is sized to allow insertion and movement of arm 211 when slide potentiometer 210 is secured to the underside of primary pole 102 using screws 213. Primary pole 102 also has a slot 223 which is sized to allow insertion and movement of arm 209 when throttle lever 206 with a hole 233 is pivotably affixed to the underside of primary pole 102 by means of a screw 207, a clamp 228, and a screw 229. Threaded rod 224 is preferably manufactured from metal and adapted so that a fore clevis 226 is screwed onto the fore end and an aft clevis 227 is screwed onto the aft end. Threaded rod 224 is therefore used to link motion between arm 211 and arm 209 by pivotally connecting fore clevis 226 to arm 211 and aft clevis 227 to arm 209. A fore elastic band 230 and an aft elastic band 231 are sized to snugly slip over fore clevis 226 and aft clevis 227 respectively, thereby preventing detachment of the devises. Other embodiments can utilize an unthreaded metal rod and metal devises wherein the devises are welded or soldered onto each end of the metal rod. Slide potentiometer 210 is concealed and protected by installation of a housing assembly 202 to primary pole 102. Housing assembly 202 comprises a left housing 204 and a right housing 205, which are preferably manufactured as molded plastic and are fastened together using screws 215. Left housing 204 preferably has a pin 217 and right housing 205 preferably has a pin 219 which both protrude into primary pole 102 and prevent rotation. Note that in other embodiments a hall effect sensor can be configured to be used instead of a slide potentiometer. Also, note that arm 209, arm 211, thread rod 224, fore clevis 226, and aft clevis 227 are all located inside the hollow portion of primary pole 102. In other embodiments, however, they can be configured to be installed outside of primary pole 102 and concealed with a housing assembly larger than housing assembly 202.

FIG. 8 and FIG. 9 show an alternate user control embodiment 300. Alternate embodiment 300 is similar to the alternate embodiment 200, however, it comprises a twist throttle mechanism instead of a throttle lever mechanism. A sleeve 306 is preferably manufactured as a machined metal but can also be manufactured as a molded plastic. Sleeve 306 preferably has a length between 3 inches and 8 inches with an inner diameter slightly larger than the outside diameter of primary pole 102 such that it can be slid thereon. Sleeve 306 also has a canted slot 307 through its surface. Additionally, primary pole 102 has a slot 321 through its surface and aligned parallel with its longitudinal axis. Canted slot 307 and slot 321 are to have the same widths and sleeve 306 is to be positioned in the same location as slot 321. An element 308 has a semi-circular cross section with a diameter slightly smaller than the inner diameter of primary pole 102 such that it can be positioned inside of primary pole 102 in the same location as slot 321 and is free to slide inside. A set screw 319 is screwed into element 308 such that it protrudes through slot 321 and canted slot 307. This configuration causes element 308 to move along the interior of primary pole 102 as sleeve 306 is twisted. Preferably thread locking fluid is applied to the threads of set screw 319 such to prevent loosening. In other embodiments a pin can be inserted into a hole in element 308 with an interference fit rather than using a set screw. Also, in other embodiments the canted slot can be on primary pole 102 instead of sleeve 306.

An arm 310 is attached to element 308 using two screws 317. The aft end of a fore tension spring 314 is concentrically attached to the shaft of fore-most screw 317 and the fore end of an aft tension spring 315 is concentrically attached to the shaft of aft-most screw 317. Holes 323 and holes 325 are drilled through primary pole 102 and are sized to accept a screw 303 and a screw 305 respectively, such that the fore end of fore tension spring 314 is secured around screw 303 and the aft end of aft tension spring 315 is secured around screw 305. Preferably the placement of holes 323, 325 are such that when element 308 is centered along the length of slot 321, both fore tension spring 314 and aft tension spring 315 have equal tension. Aft clevis 227 is pivotally attached to arm 310 such that the sliding motion of element 308 changes the position of arm 211 on slide potentiometer 210 by means of threaded rod 224, thereby varying its resistance. Two rings 302 are concentrically secured around primary pole 102, one adjacent the fore end of sleeve 306 using screw 303 and the other adjacent the aft end of sleeve 306 using screw 305, thereby preventing translational motion of sleeve 306 along the length of primary pole 102. An aft grip sleeve 312 is located around sleeve 306 and is adapted to be twisted by the user's hand. In this embodiment, slide potentiometer 210 is preferably configured with electronic speed control 164 such that the angular position of aft grip sleeve 312 controls the magnitude and direction of rotation of electric motor 156*a*, 156*b* thereby allowing the user to have fine control of thrust.

FIG. 10 and FIG. 11 show an alternate embodiment 400 featuring an altered battery configuration. Alternate embodiment 400 is similar to preferred embodiment 100, however, alternate embodiment 400 introduces a battery housing assembly 402 instead of using battery receptacle 115, thereby eliminating the need for clamps 124. Battery housing assembly 402 comprises a left battery housing 404 and a right battery housing 405 which are both preferably manufactured as a molded plastic. Left battery housing 404 and right battery housing 405 are secured directly to holes 409 in primary pole 102 using screws 407. The location of battery housing assembly 402 is preferably between fore grip sleeve 110 and aft grip sleeve 112. Preferably the underside of battery housing assembly 402 is configured to accept and draw power from a battery 414. Battery housing assembly 402 preferably has additional space to accommodate storage of electronic speed control 164.

Figure 12:
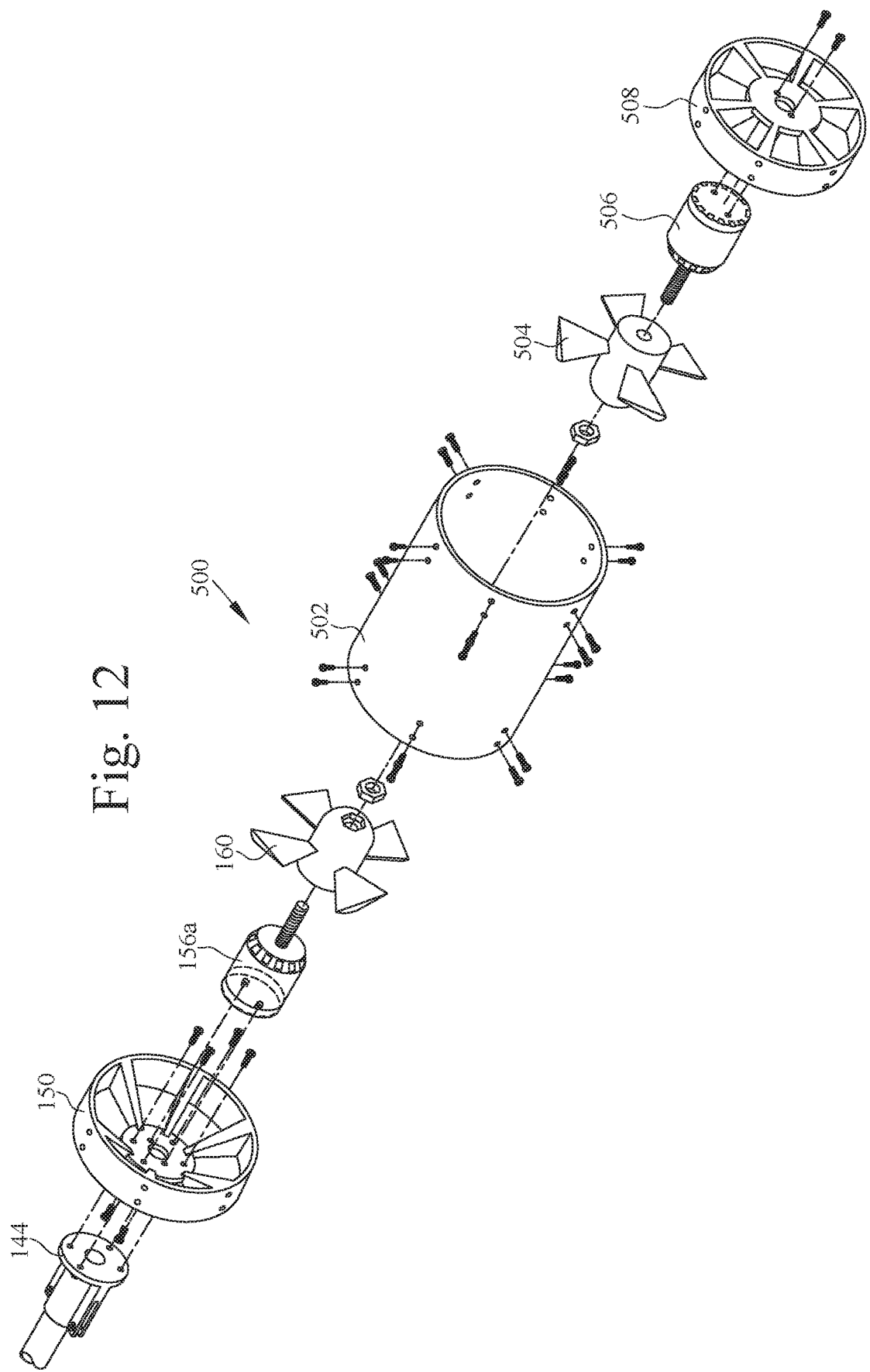
FIG. 12 is a top isometric exploded view of an alternate ducted fan assembly embodiment.

FIG. 12 shows an exploded view of an alternate ducted fan assembly embodiment 500. Alternate ducted fan assembly embodiment 500 is similar to ducted fan assembly 116 in preferred embodiment 100, however, instead of duct 154, alternate ducted fan assembly embodiment 500 comprises a longer duct 502 so that a second electric motor 506 and a second fan 504 can be installed therein, preferably to an aft stator support 508. Electric motor 506 and fan 504 are configured to accelerate the induced airflow from electric motor 156*a* and fan 160 to even greater speeds, thereby producing more thrust. The rotations of fan 160 and fan 504 are preferably counterrotating so that the airflow exiting alternate ducted fan assembly embodiment 500 is relatively irrotational.

Figure 13:
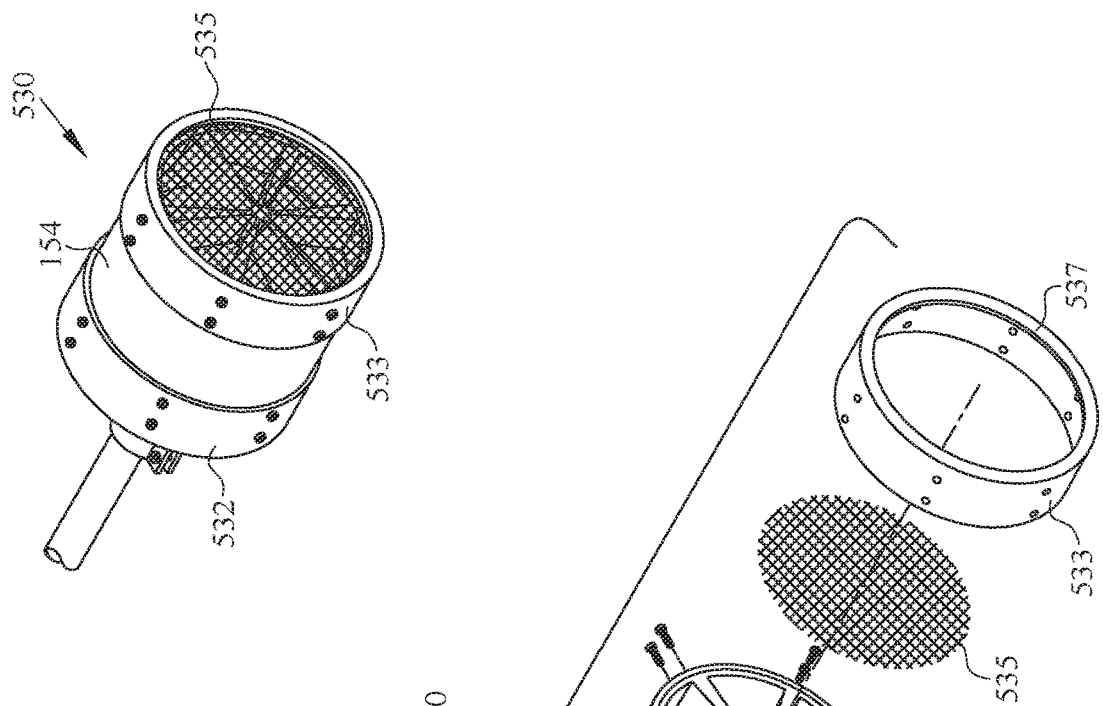
FIG. 13 is a top isometric view of an alternate ducted fan assembly embodiment.
Figure 14:
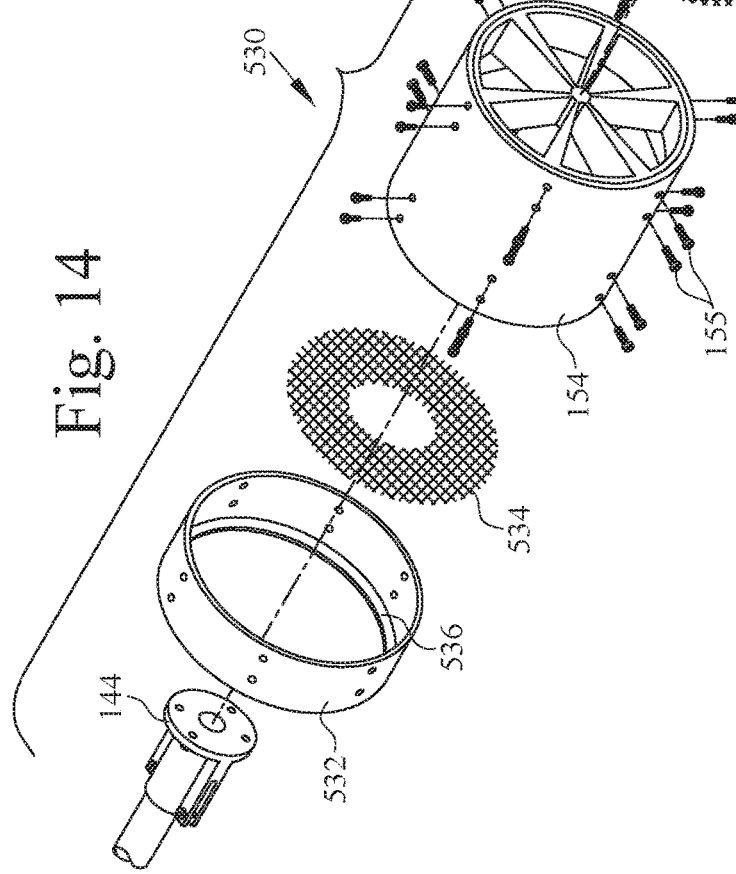
FIG. 14 is a top isometric exploded view of the embodiment shown in FIG. 13.

FIG. 13 and FIG. 14 show an alternate ducted fan assembly embodiment 530. Alternate ducted fan assembly embodiment 530 is similar to ducted fan assembly 116 in preferred embodiment 100, but further includes a protective fore mesh 534 and a protective aft mesh 535 which are preferably manufactured of a metallic material. These protective meshes act to prevent the user from accidentally sticking objects or body parts into the ducted fan assembly and causing harm. Ideally, protective fore mesh 534 is adhered to a flange 536 of a fore cover 532 using a structural adhesive. Fore cover 532 is preferably manufactured from the same material as duct 154 and sized to be fastened thereon using screws 155. Likewise, protective aft mesh 535 is adhered to a flange 537 of an aft cover 533. Aft cover 533 is then fastened to duct 154 using screws 155. Other embodiments of the ducted fan assembly can have just fore cover 532 and protective fore mesh 534 without aft cover 533 and protective aft mesh 535.

FIG. 15 shows an alternate ducted fan assembly embodiment 560. Alternate ducted fan assembly embodiment 560 is similar to ducted fan assembly 116 in preferred embodiment 100, but further includes a converging nozzle 562 which is preferably manufactured from the same material as duct 154. The existence of converging nozzle 562 accelerates the exiting airflow to higher speeds, thereby producing more thrust and enhancing the user's experience. Converging nozzle 562 is preferably fastened to the aft end of duct 154 using screws 155, however, in other embodiments it may be secured directly to duct 154 using a structural adhesive. Alternatively, the duct can be formed or molded to have an inherently converging outlet, therefore eliminating the need for a separate and detachable converging nozzle piece.

FIG. 16 shows an alternate embodiment 590 featuring an off-the-shelf ducted fan assembly 592. The ability to install an off-the-shelf ducted fan assembly significantly improves ease of manufacturing of the graspable human propulsion device. Off-the-shelf ducted fan assembly 592 is secured to mount 144 by means of an intermediary mount 594. Mount 594 is preferably manufactured as a machined metal but can also be manufactured as a molded plastic. Mount 594 comprises a left arm 596 and a right arm 597 which are sized to support the mounting flanges common to off-the-shelf ducted fan assembly 592. Off-the-shelf ducted fan assembly 592 is secured to left arm 596 and right arm 597 using screws 593. Mount 594 is then secured to mount 144 using screws 595. In the event that the off-the-shelf ducted fan assembly does not have mounting flanges, it can be fitted with flanged pipe straps. Preferably, the off-the-shelf ducted fan assembly is electric powered, but can also be internal combustion piston engine powered or gas turbine engine powered.

FIG. 17 shows an alternate embodiment comprising a second ducted fan assembly 116 arranged parallel and side-by-side first ducted fan assembly 116, thereby enabling the graspable human propulsion device to produce more thrust. However, the device does not have to be limited to just two ducted fan assemblies 116 and can comprise an arbitrary quantity as long as ducted fan assemblies 116 are configured to produce thrust in the same direction.

FIG. 18 shows an alternate embodiment 600 featuring an extensible pole. Alternate embodiment 600 is similar to preferred embodiment 100, however, instead of primary pole 102, it comprises a major hollow pole 602 and a minor pole 606. The outer diameter of minor pole 606 is slightly less than the inner diameter of major hollow pole 602 so that minor pole 606 can be inserted into major hollow pole 602 to an arbitrary depth and secured therewith by a cam lever clamping means. A clamp 608 has a partial circular perimeter and is preferably manufactured as a machined metal. It is concentrically located around a groove 617 and clamped thereon using a screw 609 and a pin 613. Pin 613 is translationally fixed to screw 609 and acts as a pivot point for a cam lever 612 such that the clamping pressure of clamp 608 on major hollow pole 602 varies depending on the angular position of cam lever 612, thereby allowing the user to lock the insertion depth of minor pole 606 into major hollow pole 602. Major hollow pole 602 has a notch 615 on the same end as groove 617 to reduce the structural rigidity of major hollow pole 602, thereby improving the clamping feature. Note that in other embodiments clamp 608 can be welded directly to major hollow pole 602. An end cap 618 is sized to plug the open end of minor pole 606 and a lateral pole 604 is secured perpendicularly to the fore end of minor pole 606 using an upper fitting 620, a lower fitting 622, and screws 621. A fore grip sleeve 610 is concentrically placed around lateral pole 604 and the open end of lateral pole 604 is plugged with an end cap 619. This extensible pole feature gives the user the option to customize the length of the graspable human propulsion device according to his or her body size.

FIG. 19 shows an alternate embodiment 630 also featuring an extensible pole. Alternate embodiment 630 is similar to alternate embodiment 600 except that it features a spring button clip mechanism instead of a cam lever clamping mechanism. A flat spring button clip 632 is manufactured as a formed metal to have a button 633 profile on one end which has a diameter of approximately 0.25 inches. A minor hollow pole 634 has a hole 635 on its side and major hollow pole 602 has holes 637 on its side, wherein holes 635, 637 are of slightly larger diameter than button 633. Flat spring button clip 632 is located inside of minor hollow pole 634 such that button 633 protrudes through hole 635 and has a spring effect. Button 633 can then be depressed by the user thereby allowing sliding of minor hollow pole 634 into major hollow pole 602 until button 633 pops back up through hole 635 and a concentrically aligned hole 637. Note that in other embodiments holes 635, 637 can be located on the underside of the respective poles.

FIG. 20 shows an alternate embodiment 700 featuring an altered user control location. Alternate embodiment 700 is similar to preferred embodiment 100, however, throttle lever 106 is instead mounted on a lateral pole 704, proximate fore grip sleeve 110, thereby allowing the user to control thrust with his or her fore hand. Alternate embodiment 700 shows a throttle lever mechanism, but other embodiments may have a twist throttle mechanism or a knobbed slide potentiometer mounted in this location instead.

FIG. 21 shows an alternate embodiment 730 featuring an altered battery location. Alternate embodiment 730 is similar to preferred embodiment 100, however, battery 114a and battery receptacle 115 are mounted fore of lateral pole 104 instead of aft of it. In other embodiments the graspable human propulsion device can have a plurality of batteries and battery receptacles affixed anywhere along the length of the primary pole, thereby offering an increased energy storage capacity.

FIG. 22 shows an alternate embodiment 760 featuring an altered fore grip configuration. Alternate embodiment 760 is similar to preferred embodiment 100, however, alternate embodiment 760 further comprises a vertical pole 762 configured to raise lateral pole 104 closer to the user's torso, thereby improving user comfort. A left fitting 764 and a right fitting 766 are used to clamp vertical pole 762 proximate the fore end of primary pole 102 using screws 767. A fore fitting 768 and an aft fitting 770 are used to clamp lateral pole 104 to the upper end of vertical pole 762 using screws 771. Preferably, fore fitting 768 and aft fitting 770 are designed to provide a ninety-degree joint, however, in other embodiments the fore fitting and the aft fitting may be designed to an arbitrary fitting angle. In addition, vertical pole 762 does not have to be oriented strictly vertically, rather, it can be slightly canted to the right or left side of primary pole 102.

Figure 24:
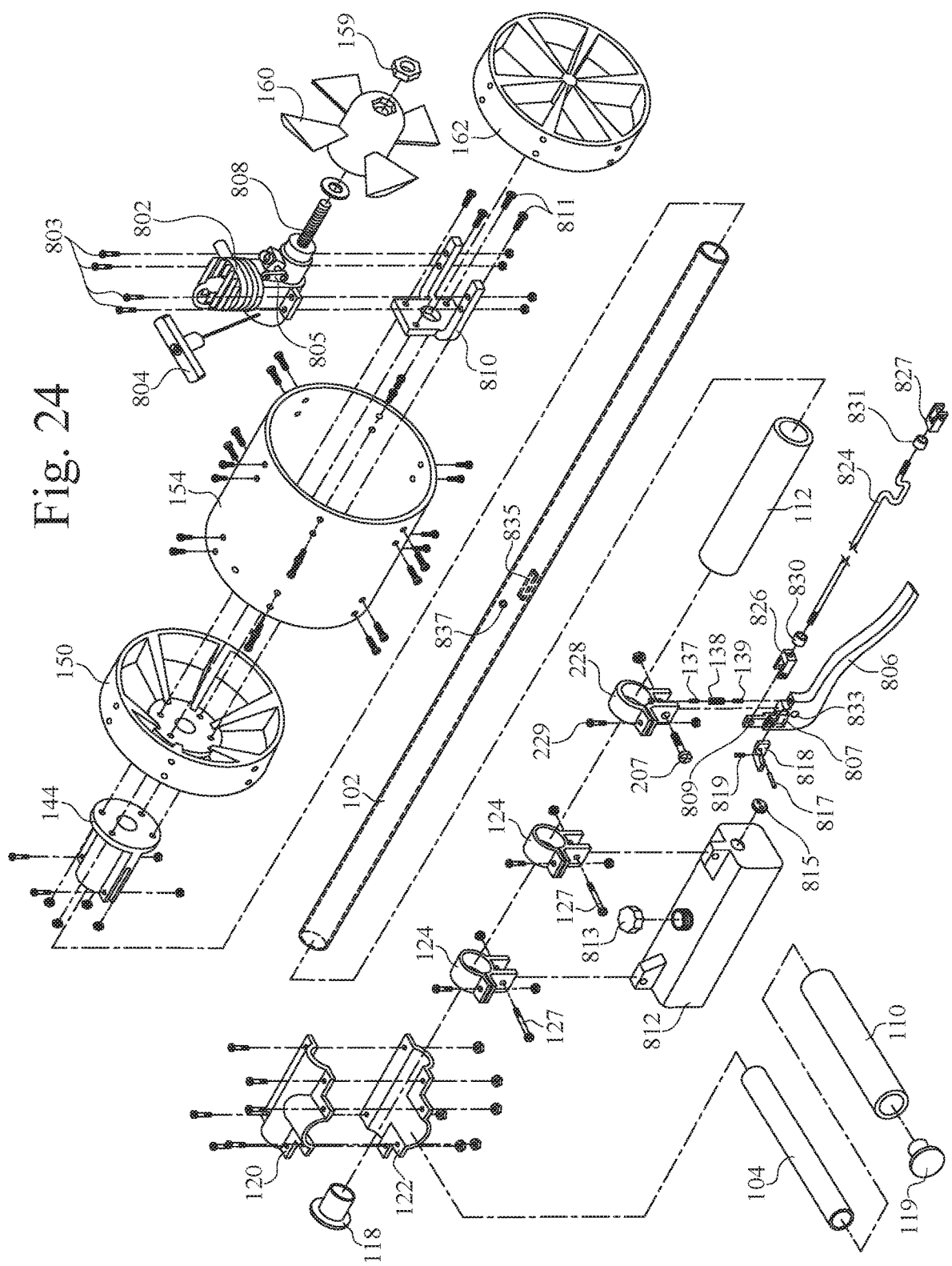
FIG. 24 is a top isometric exploded view of the embodiment shown in FIG. 23.

FIG. 23 and FIG. 24 show an alternate embodiment 800 featuring an internal combustion piston engine. Alternate embodiment 800 is similar to preferred embodiment 100, however, instead of having battery 114a, battery compartment 115, and ducted fan assembly 116, alternate embodiment 800 comprises a fuel tank 812 and a ducted fan assembly 816. Ducted fan assembly 816 comprises an internal combustion piston engine 802 which preferably has a pull string handle 804 whereby the user can pull to start the engine. Internal combustion piston engine 802 must be small enough to fit within the circumference of duct 154, otherwise a cutout must be made through the wall of duct 154 to accommodate protrusion of internal combustion piston engine 802. Internal combustion piston engine 802 also has a carburetor control arm 805 and a threaded shaft 808 wherein fan 160 is attached. Internal combustion piston engine 802 is mounted to an engine mount 810 using screws 803. Engine mount 810 is preferably manufactured as a molded plastic but can also be manufactured as a machined metal. Engine mount 810 is secured to fore stator support 150 and mount 144 using screws 811.

Throttling of internal combustion piston engine 802 is controlled by a throttle lever 806. Throttle lever 806 has a hole 833 such that it can be pivotally secured to the flanged portion of clamp 228 using screw 207. Primary pole 102 has a slot 835 which is sized to allow insertion and movement of arm 809. Throttle lever 806 has a cutout 807 in the vicinity of arm 809 and is sized to pivotally house a lever 818 by means of a pin 817. Lever 818 is preloaded with a spring 819 such that the range of motion of throttle lever 806 is limited since lever 818 interferes with clamp 228 or the aft edge of slot 835. However, when lever 818 is pivoted by the user's finger, it no longer interferes with clamp 228 and the range of motion of throttle lever 806 increases. Since arm 809 is linked to carburetor control arm 805 via a pushrod 824, this increased range of motion allows the carburetor of internal combustion piston engine 802 to be fully closed, thereby causing it to shut off.

The interconnection between throttle lever 806 and carburetor control arm 805 comprises pushrod 824, a fore clevis 826, and an aft clevis 827. Pushrod 824 is manufactured as a bent metal rod and preferably has threads on both ends. Pushrod 824 is bent such to navigate from throttle lever 806, through mount 144, through fore stator support 150, through engine mount 810, and to carburetor control arm 805. Fore clevis 826 is screwed onto the fore end of pushrod 824 and aft clevis 827 is screwed onto the aft end. Pushrod 824 is therefore used to link motion between arm 809 and carburetor control arm 805 by pivotally connecting fore clevis 826 to arm 809 and aft clevis 827 to carburetor control arm 805. A fore elastic band 830 and an aft elastic band 831 are sized to snugly slip over fore clevis 826 and aft clevis 827 respectively, thereby preventing detachment of the devises. Fuel tank 812 and a removable cap 813 are preferably manufactured as molded plastics, and fuel tank 812 is mounted to primary pole 102 by means of clamps 124 and screws 127. Primary pole 102 has a hole 837 which is sized to accept necessary fuel lines that run between a fuel line seal 815 and internal combustion piston engine 802. Other embodiments may use an off-the-shelf internal combustion piston engine ducted fan or gas turbine engine, in which case would use a similar fuel tank as shown in FIG. 23.

FIG. 25 shows an alternate embodiment 900 featuring an altered ducted fan assembly location. Alternate embodiment 900 is similar to preferred embodiment 100, however, instead of ducted fan assembly 116 being mounted to the aft end of primary pole 102, a ducted fan assembly 916 is mounted to the fore end. This configuration operates by accelerating air along the length of primary pole 102 thereby producing a forward imparting thrust. This configuration offers the user a different experience since ducted fan assembly 916 creates a pulling effect on the fore end of primary pole 102 rather than a pushing effect on the aft end.

FIG. 26 shows an alternate embodiment 930 featuring a fore mounted ducted fan assembly in conjunction with an aft mounted ducted fan assembly. Alternate embodiment 930 is similar to preferred embodiment 100, however, instead of primary pole 102, it comprises a longer primary pole 902. Ducted fan assembly 916 is mounted to the fore end and ducted fan assembly 116 is mounted to the aft end, both configured to accelerate airflow in the same direction when the user gives control input, thereby generating higher thrusts than preferred embodiment 100 while offering an improved balanced distribution of weight. In other embodiments a plurality of ducted fan assemblies 916 can be mounted to the forward end of primary pole 902 and a plurality of ducted fan assemblies 116 can be mounted to the aft end.

CONCLUSION, RAMIFICATIONS, AND SCOPE

Accordingly, the reader will see that the graspable human propulsion device of this invention can be utilized to propel oneself while mounted on a personal transportation apparatus. Furthermore, the graspable human propulsion device has the additional advantages in that the user will have a convenient and enjoyable method of propelling oneself while mounted on a personal transportation apparatus such as a skateboard.

the device is significantly more comfortable to wield compared to prior art.

the device is to be supported by both hands of the user instead of just one, thereby reducing user fatigue caused by the weight of the device.

this device is easy to ditch in the event of an emergency.

this device is cross-compatible with a variety of makes and models of personal transportation apparatuses.

this device is effective at producing thrust even on dirt, snowy, and icy surfaces.

this device does not require any tedious installation on existing personal transportation apparatuses.

While the above description contains many specifities, these should not be construed as limitations on the scope of the invention, but as exemplifications of the presently preferred embodiments thereof. Many other ramifications and variations are possible within the teachings of the invention. For example, the primary pole may contain additional surfaces and housings along its length, the throttle lever may have a trigger guard installed around it, the device may have a strap attached to it to aid in transportation while not being operated, the battery may be permanently concealed inside a housing attached to the primary pole that has a charging port, and the ducted fan assembly may include a variable pitched propeller.

Thus, the scope of the invention should be determined by the appended claims and their legal equivalents, and not by the examples given above.

I claim:

1. A graspable human propulsion device comprising:
   (a.) primary pole adapted to be grasped by a user's first hand;
   (b.) a lateral pole affixed relatively perpendicular to said primary pole, proximate the fore end thereof, and adapted to be grasped by said user's second hand;
   (c.) a ducted fan assembly comprising a motor, a fan driven by said motor, and a duct for housing said fan, wherein said ducted fan assembly is affixed to one end of said primary pole and adapted to accelerate airflow on relatively the same axis as said primary pole;
   (d.) a stored energy means affixed to said primary pole;
   (e.) a control means for allowing said user to regulate the initiation, direction, and rotational speed of said motor;
   wherein said user mounts onto a personal transportation apparatus and holds said graspable human propulsion device with one hand grasping said primary pole and the other hand grasping said lateral pole so that said primary pole points toward the direction of desired travel, thereby enabling the user to produce a propulsive thrust by manipulating said control means.

2. The graspable human propulsion device according to claim 1 further comprising a fore grip sleeve affixed to said lateral pole and an aft grip sleeve affixed to said primary pole.

3. The graspable human propulsion device according to claim 1 wherein said motor is an electric motor, and said stored energy means comprises a battery receptacle rigidly affixed to said primary pole and a battery configured to be inserted into said battery receptacle.

4. The graspable human propulsion device according to claim 3 further comprising an on/off switch mounted thereon and configured to provide or withhold electric power from said battery to said electric motor.

5. The graspable human propulsion device according to claim 3 wherein said control means comprises a throttle lever pivotally affixed to either said primary pole or said lateral pole, a potentiometer engaged with said throttle lever, and an electronic speed control configured with said potentiometer to deliver power from said battery to said electric motor, wherein said user can manipulate the angular position of said throttle lever to power said electric motor with a proportional amount of power.

6. The graspable human propulsion device according to claim 5 further including a push button attached thereon and configured to said electronic speed control such that when said push button is depressed, the rotational direction of said electric motor caused by actuation of said throttle lever is reversed.

7. The graspable human propulsion device according to claim 3 wherein said control means comprises a throttle lever pivotally affixed to either said primary pole or said lateral pole, a hall effect sensor engaged with said throttle lever, and an electronic speed control configured with said hall effect sensor to deliver power from said battery to said electric motor, wherein said user can manipulate the angular position of said throttle lever to power said electric motor with a proportional amount of power.

8. The graspable human propulsion device according to claim 3 wherein said control means comprises a knobbed slide potentiometer affixed to either said primary pole or said lateral pole, and an electronic speed control configured with said knobbed slide potentiometer to deliver power from said battery to said electric motor, wherein said user can manipulate the position of the knob on said knobbed slide potentiometer to power said electric motor with a proportional amount of power.

9. The graspable human propulsion device according to claim 3 wherein said control means comprises a twist throttle mechanism located on either said primary pole or said lateral pole, a potentiometer engaged with said twist throttle mechanism, and an electronic speed control configured with said potentiometer to deliver power from said battery to said electric motor, wherein said user can manipulate the position of said twist throttle mechanism to power said electric motor with a proportional amount of power.

10. The graspable human propulsion device according to claim 3 wherein said ducted fan assembly further comprises a second electric motor and a second fan driven by said second electric motor, wherein said second electric motor and said second fan are configured to accelerate airflow in the same direction as the airflow induced by said fan aforementioned in claim 1.

11. The graspable human propulsion device according to claim 1 further comprising a mesh screen affixed to the inlet and/or outlet of said duct.

12. The graspable human propulsion device according to claim 1 further comprising a converging nozzle affixed to the outlet of said duct.

13. The graspable human propulsion device according to claim 1 further comprising one or more additional ducted fan assemblies secured to either the fore end or aft end of said primary pole and adapted to accelerate airflow on relatively the same axis as said primary pole.

14. The graspable human propulsion device according to claim 1 wherein said primary pole comprises an aft major hollow pole, and a fore minor pole with an outer diameter smaller than the inner diameter of said aft major hollow pole such that said fore minor pole can slide to an arbitrary depth inside the fore end of said aft major hollow pole and be locked into place by a locking mechanism means.

15. The graspable human propulsion device according to claim 14 wherein said locking mechanism means comprises a notch on the fore end of said aft major hollow pole, a clamp mounted around said aft major hollow pole in the same location as said notch, and a cam lever pivotally affixed to said clamp by means of a pin, a screw, and a nut so that depression of said cam lever by said user clamps said aft major hollow pole to said fore minor pole, thereby preventing relative sliding.

16. The graspable human propulsion device according to claim 14 wherein said fore minor pole is hollow and said locking mechanism comprises a plurality of holes of equal diameter in a row along the side of said aft major hollow pole, a hole in the side of said fore minor pole, and a flat spring button clip located inside said fore minor pole and configured by said user so that the button on said flat spring button clip protrudes through said hole on said fore minor pole and one of said holes on said aft major hollow pole, thereby preventing relative sliding.

17. The graspable human propulsion device according to claim 1 further comprising a vertical pole affixed to said primary pole, proximate the fore end thereof, and configured to elevate the relative position of said lateral pole with respect to said primary pole, thereby positioning said lateral pole closer to said user's torso.

18. The graspable human propulsion device according to claim 1 wherein said motor is an internal combustion piston engine, and said stored energy means comprises a fuel tank rigidly affixed to said primary pole and configured to supply fuel to said internal combustion piston engine.

19. The graspable human propulsion device according to claim 1 wherein said motor is a gas turbine engine, and said stored energy means comprises a fuel tank affixed to said primary pole and configured to supply fuel to said gas turbine engine.

20. A graspable human propulsion device comprising:
(a.) a longitudinal structure adapted to be grasped by a user's first hand;
(b.) a lateral structure affixed relatively perpendicular to said longitudinal structure, proximate the fore end thereof, and adapted to be grasped by said user's second hand;
(c.) a ducted fan assembly comprising a motor, a fan driven by said motor, and a duct for housing said fan, wherein said ducted fan assembly is affixed to one end of said longitudinal structure and adapted to accelerate airflow on relatively the same axis as said longitudinal structure;
(d.) a stored energy means affixed to said primary pole;
(e.) a control means for allowing said user to regulate the initiation, direction, and rotational speed of said motor;
whereby said human graspable propulsion device generates a user regulated airflow along the axis of said longitudinal structure, thereby producing a thrust in the opposite direction such to propel said user while mounted on a personal transportation apparatus.

* * * * *